(12) United States Patent
Kiyohara

(10) Patent No.: US 7,573,389 B2
(45) Date of Patent: Aug. 11, 2009

(54) RADIO-FREQUENCY IDENTIFICATION TAG COMMUNICATION DEVICE

(75) Inventor: Yuji Kiyohara, Nagoya (JP)

(73) Assignee: Brother Kogyo Kabushiki Kaisha, Nagoya-shi, Aichi-ken ( * ) Notice: Subject to any disclaimer, the term of this patent is extended or adjusted under 35 U.S.C. 154(b) by 307 days.

(21) Appl. No.: 11/518,232

(22) Filed: Sep. 11, 2006

(65) Prior Publication Data

US 2007/0001811 A1    Jan. 4, 2007

Related U.S. Application Data

(63) Continuation-in-part of application No. PCT/JP2005/002060, filed on Feb. 10, 2005.

(30) Foreign Application Priority Data

Mar. 19, 2004  (JP) ............................. 2004-081040

(51) Int. Cl.
*G08B 13/14* (2006.01)
(52) U.S. Cl. ................. 340/572.7; 340/572.1; 348/383; 348/380; 348/378; 455/62; 455/69; 455/424
(58) Field of Classification Search .............. 340/872.7, 340/572.7
See application file for complete search history.

(56) References Cited

U.S. PATENT DOCUMENTS 6,522,898 B1 * 2/2003 Kohno et al. ............. 455/562.1
7,071,874 B2   7/2006 Doi

FOREIGN PATENT DOCUMENTS

DE         10028077 A1    12/2001
GB         2266998 A      11/1993
JP         S58096265      9/1983
JP         S62123382      6/1987
JP         H03254228      11/1991
JP         H05281346      10/1993
JP         H09-232848 A   9/1997

(Continued)

OTHER PUBLICATIONS

International Bureau, International Preliminary Report on Patentability for related International Application No. PCT/JP2005/002060 dated Nov. 29, 2006.

(Continued)

*Primary Examiner*—Benjamin C Lee
*Assistant Examiner*—Ojiako Nwugo
(74) *Attorney, Agent, or Firm*—Baker Botts L.L.P.

(57) ABSTRACT

A radio-frequency identification tag communication device including a BFA weight-value setting portion operable to control a directivity of a transmitter antenna, and an adaptive processing portion operable to implement an adaptive control of a weight to be given to a received signal received by each of a plurality of antenna elements, on the basis of a reply signal transmitted from a radio-frequency identification tag, so that the directivity of the transmitter antenna is changed to a direction in which the frequency identification tag in question is expected to exist, and the weight to be given to each received signal is subjected to the adaptive control, whereby the sensitivity of communication of the communication device with the radio-frequency identification tag is improved.

13 Claims, 14 Drawing Sheets

FOREIGN PATENT DOCUMENTS

| JP | H11251996 | 9/1999 |
| JP | 2002026630 | 1/2002 |
| JP | 2003124856 | 4/2003 |
| JP | 2003-283466 A | 10/2003 |

OTHER PUBLICATIONS

International Search Report for PCT/JP2005/002060, mailed Apr. 26, 2005.

Japan Patent Office, Office Action in priority Patent Application No. JP 2004-081040, mailed Oct. 14, 2008.

Pekka Salonen et al., "An Intelligent 2.45GHz Beam-Scanning Array For Modern RFID Reader," IEEE Press, New York, 2000.

European Patent Office, Supplementary European Search Report for European Patent Appl'n No. 05710112.3-2220 (counterpart to the above-captioned U.S. patent appl'n) mailed Jan. 15, 2008.

* cited by examiner

RADIO-FREQUENCY IDENTIFICATION TAG COMMUNICATION DEVICE

BACKGROUND OF THE INVENTION

1. Field of the Invention

The present invention relates to an improvement of a radio-frequency identification tag communication device capable of radio communication with radio-frequency identification tags for writing and reading information on and from the radio-frequency identification tags.

2. Discussion of the Related Art

There is known an RFID (Radio-Frequency Identification) communication system wherein a radio-frequency identification tag communication device (interrogator) reads out information, in a non-contact fashion, from small radio-frequency identification tags (transponders) on which desired information is written. In this RFID communication system, the radio-frequency identification tag communication device is capable of reading out the information from the radio-frequency identification tags, even where the radio-frequency identification tags are contaminated or located at positions invisible from the radio-frequency identification tag communication device. For this reason, the RFID communication system is expected to be used in various fields, such as administration and inspection of articles of commodity.

There are generally well known array antenna techniques available in a radio-frequency identification tag communication device which has a plurality of antenna elements and which is arranged to effect radio communication through those antenna elements. Examples of such array antenna techniques include a phased-array control of the phase of a signal corresponding to each of the antenna elements, and an adaptive-array control of the phase and amplitude of the signal corresponding to each antenna element. Patent Document 1 discloses an example of an adaptive-array antenna controller arranged to change an antenna control coefficient according to the position (direction) of an object tag, for thereby increasing a maximum distance to the object tag with which the communication device can communicate.

Patent Document 1: JP-11-251996 A

However, the plurality of radio-frequency identification tags with which the radio-frequency identification tag communication device communicates are usually located at mutually distant positions, and reflected waves transmitted from those tags have extremely low intensities, so that the maximum distance of communication with the tags according to the conventional array antenna techniques is limited, and the communication device has a risk of failure of communication with the desired radio-frequency identification tags. Accordingly, there has been a need of developing a radio-frequency identification tag communication device having an increased maximum distance of communication with the radio-frequency identification tags.

SUMMARY OF THE INVENTION

The present invention was made in view of the background art described above. It is an object of this invention to provide a radio-frequency identification tag communication device which has an increased maximum distance of communication with the radio-frequency identification tags.

The object described above may be achieved according to the principle of the present invention, which provides a radio-frequency identification tag communication device for radio communication with a radio-frequency identification tag, by transmitting a transmission signal from a transmitter antenna toward the radio-frequency identification tag, and receiving a reply signal transmitted from the radio-frequency identification tag in response to the transmission signal, through a receiver antenna having a plurality of antenna elements, the radio-frequency identification tag communication device being characterized by comprising: a directivity control portion operable to control a directivity of the transmitter antenna; and an adaptive weight control portion operable to implement an adaptive control of a weight to be given to a received signal received by each of the plurality of antenna elements, on the basis of the reply signal transmitted from the radio-frequency identification tag.

As described above, the radio-frequency identification tag communication device according to the present invention comprises the directivity control portion operable to control the directivity of the transmitter antenna, and the adaptive weight control portion operable to implement the adaptive control of the weight to be given to the received signal received by each of the plurality of antenna elements, on the basis of the reply signal transmitted from the radio-frequency identification tag. Accordingly, the directivity of the transmitter antenna is changed to a direction in which the radio-frequency identification tag in question is expected to exist, and the weight to be given to each received signal is subjected to the adaptive control, so that the sensitivity of communication of the communication device with the radio-frequency identification tag is improved. Namely, the present radio-frequency identification tag communication device has an increased maximum distance of communication with the radio-frequency identification tag.

In a preferred form of this invention, the transmitter antenna has a plurality of antenna elements, and the directivity control portion is operable to control at least one of a phase and an amplitude of the transmission signal to be transmitted from each of the plurality of antenna elements, for thereby controlling the directivity of the transmitter antenna. In this form of the invention, the directivity of the transmitter antenna is controlled in a practically effective manner.

In a further preferred form of the invention, the transmission signals to be respectively transmitted from the plurality of antenna elements and the received signals to be respectively received by the plurality of antenna elements have a same frequency, and the adaptive weight control portion controls the weight to be given to the received signals such that the weight to be given to the received signals is different from a weight to be given to the transmission signals. In this form of the invention wherein the transmission signals to be transmitted from the plurality of antenna elements and the received signals to be received by the plurality of antenna elements have the same frequency, the transmission directivity and the reception directivity are set differently from each other, so that the maximum distance of communication with the radio-frequency identification tag can be increased.

In another preferred form of the invention, the adaptive weight control portion is operable to set an initial value of the weight to be given to the received signal, on the basis of the directivity of the transmitter antenna set by the directivity control portion. Accordingly, the weight to be given to the received signal can be rapidly converged into an optimum value, and a bit string included in the reply signal transmitted from the radio-frequency identification tag can be received, without a failure to receive a leading portion of the bit string, so that the maximum distance of communication with the radio-frequency identification tag can be further increased. In addition, the preamble of the bit string can be shortened, so that the time required for communication with the radio-frequency identification tag can be shortened, making it possible to increase the number of radio-frequency identification tags within a unit time.

In a further preferred form of this invention, the directivity control portion is operable to set again the directivity of the transmission antenna, on the basis of a value of the weight into which the weight has been converged by the adaptive control of the weight to be given to the received signal by the adaptive processing portion. Accordingly, the transmission signals having an increased intensity can be transmitted toward the radio-frequency identification tag in question, so that the maximum distance of communication with the radio-frequency identification tag can be further increased.

In another preferred form of the invention, the transmitter antenna and the receiver antenna commonly use a plurality of antenna elements, so that the radio-frequency identification tag communication device can be small-sized.

In a further preferred form of the invention, the directivity control portion is one of a phased-array control portion and a beam forming control portion operable to control the weight to be given to each of the transmission signals to be transmitted from the plurality of antenna elements, on the basis of the directivity of the transmitter antenna, and said adaptive weight control portion is an adaptive-array control portion operable to implement the adaptive control of the weight to be given to each of the received signals to be received by plurality of antenna elements. Accordingly, the directivity of the transmitter antenna and the directivity of the transmitter antenna can be controlled in a practically effective manner.

In another preferred form of this invention, the directivity control portion is operable to control the weight to be given to the transmission signal, so as to maximize a density of transmission power in a direction determined by the directivity of the transmitter antenna. Accordingly, the directivity of the transmitter antenna can be changed in a practically effective manner, to a direction in which the radio-frequency identification tag in question is expected to exist.

In a further preferred form of the invention, the adaptive weight control portion is operable to implement the adaptive control of the weight to be given to each of the received signals received by the plurality of antenna elements, so as to maximize a signal-to-noise ratio (a ratio of a desired signal to an interference signal) of a composite signal which is synthesized by combining together the received signals to which the weight has been given. Accordingly, the weight to be given to each received signal can be controlled in a practically effective manner.

In another preferred form of the invention, the transmitter antenna has a plurality of antenna elements, and the transmitter antenna and the receiver antenna have at least one common antenna element, the directivity control portion being operable to give a weight to the transmission signal to be transmitted from each of the at least one common antenna element, while the adaptive weight control portion being operable to give the weight to the received signal received by each of the at least one common antenna element. The radio-frequency identification tag communication device according to this form of the invention has a maximum distance of communication which is increased in a practically effective manner.

BRIEF DESCRIPTION OF THE DRAWING

The above and other objects, features, advantages and industrial and technical significance of this invention will be better understood by reading the following detailed description of preferred embodiments of the invention, when considered in connection with the accompanying drawings, in which.

DETAILED DESCRIPTION OF PREFERRED EMBODIMENTS

Figure 1:
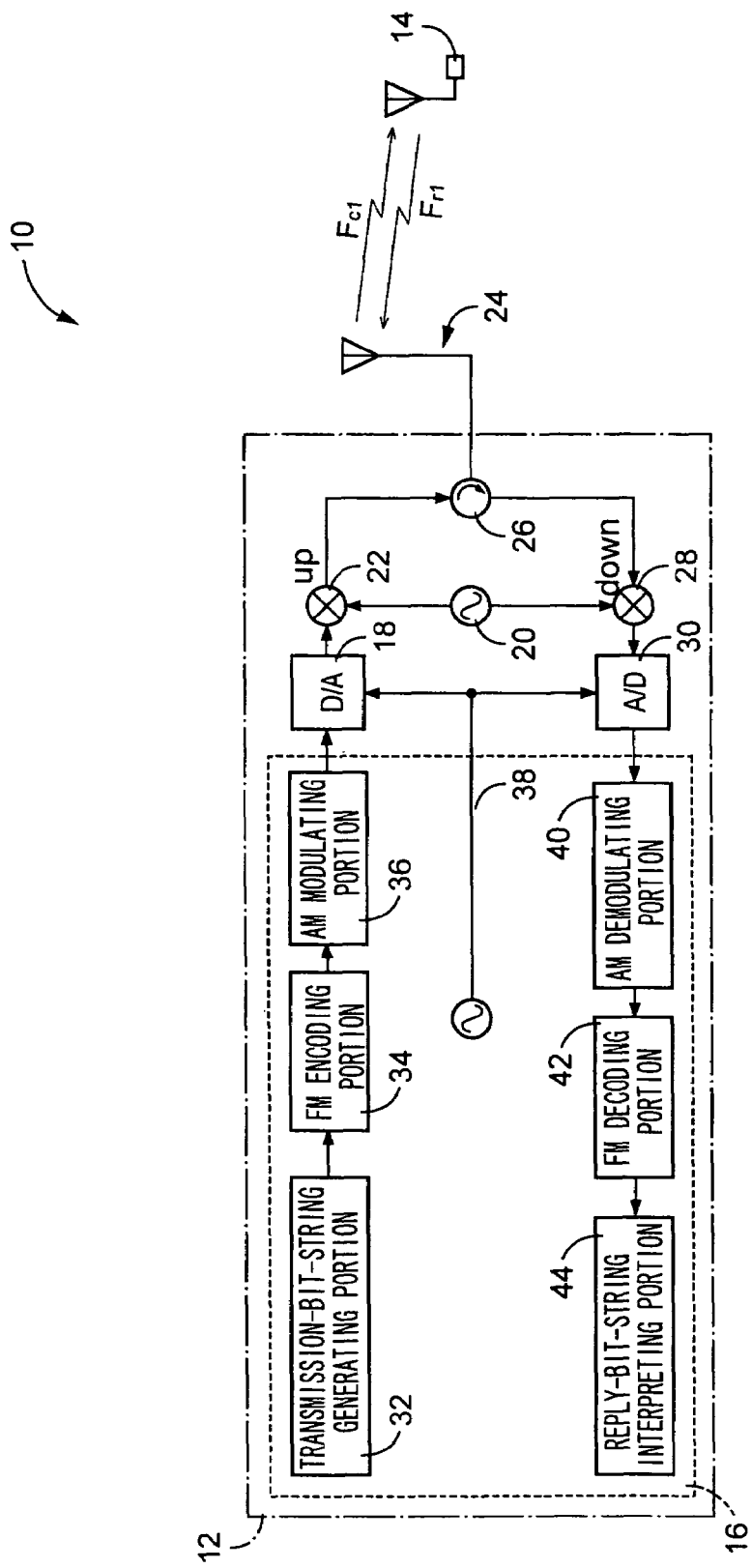
FIG. 1 is a view showing an arrangement of an ordinary RFID communication system

Referring to the drawings, preferred embodiments of this invention will be described in detail.

Embodiment 1

Referring to FIG. 1, there is shown an arrangement of an ordinary RFID (Radio-Frequency Identification) communication system 10. This RFID communication system 10 includes a radio-frequency identification tag communication device 12 functioning as an interrogator, and a radio-frequency identification tag 14 functioning as a transponder. The radio-frequency identification tag communication device 12 is arranged to transmit a transmission signal in the form of a transmission wave $F_{c1}$, and the radio-frequency identification tag 14 is arranged to receive the transmission wave $F_{c1}$ and replies to the received transmission wave $F_{c1}$ by transmitting a reply signal in the form of a reflected wave $F_{r1}$ which is generated by modulating the transmission signal $F_{c1}$ on the basis of predetermined information. The radio-frequency identification tag communication device 12 is further arranged to receive the reflected wave $F_{r1}$, and demodulate the received reflected wave $F_{r1}$. Thus, the radio-frequency identification tag communication device 12 is arranged to effect radio communication with the radio-frequency identification tag 14. In a common RFID communication system, radio communication is effected between at least one radio-frequency identification tag communication device 12 and a plurality of radio-frequency identification tags 14. However, FIG. 1 shows only one radio-frequency identification tag communication device 12 and only one radio-frequency identification tag 14.

The radio-frequency identification tag communication device 12 is arranged to effect communication with the radio-frequency identification tag 14, for performing at least one of information reading from and information writing on the radio-frequency identification tag 14, and includes a DSP (Digital Signal Processor) 16, a transmission-signal D/A converting portion 18, a frequency-conversion-signal output portion 20, an up converter 22, a transmitter/receiver antenna 24, a directional coupler 26, a down converter 28, and a received-signal A/D converting portion 30, as shown in FIG. 1. The DSP 16 is arranged to perform digital signal processing operations for generating a transmission signal in the form of a digital signal and demodulating the reply signal received from the radio-frequency identification tag 14. The transmission-signal D/A converting portion 18 is arranged to convert the transmission signal generated by the DSP 16, into an analog signal. The frequency-conversion-signal output portion 20 is arranged to generate a predetermined frequency conversion signal. The up converter 22 is arranged to increase the frequency of the analog signal generated by the transmission-signal D/A converting portion 18, by an amount equal to the frequency of the frequency conversion signal generated by the frequency-conversion-signal output portion 20. The transmitter/receiver antenna 24 is arranged to transmit the transmission wave $F_{c1}$ which is the analog signal the frequency of which has been increased by the up converter 22, and to receive the reflected wave $F_{r1}$ transmitted from the radio-frequency identification tag 14 in response to the transmitted transmission wave $F_{c1}$. The directional coupler 26 is arranged to apply the analog signal the frequency of which has been increased by the up converter 22, to the transmitter/receiver antenna 24, and to apply the received signal received by the transmitter/receiver antenna 24, to the down converter 28. The down converter 28 is arranged to reduce the frequencies of the received signal from the transmitter/receiver antenna 24 through the directional coupler 26, by an amount equal to the frequency of the frequency conversion signal generated by the frequency-conversion-signal output portion 20. The received-signal A/D converting portion 30 is arranged to convert the received signal the frequency of which has been reduced by the down converter 28, into a digital signal and to apply the digital signal to the DSP 16.

The DSP 16 described above is a so-called microcomputer system incorporating a CUP, a ROM and a RAM and operable to perform signal processing operations according to programs stored in the ROM, while utilizing a temporary data storage function of the RAM. The DSP 16 is provided with functional components including a transmission-bit-string generating portion 32, an FM encoding portion 34, an AM modulating portion 36, a sampling-frequency oscillating portion 38, an AM demodulating portion 40, an FM decoding portion 42 and a reply-bit-string interpreting portion 44. The transmission-bit-string generating portion 32 is arranged to generate a command bit string corresponding to the transmission signal to be transmitted to the radio-frequency identification tag 14. The FM encoding portion 34 is arranged to encode a digital signal generated by the transmission-bit-string generating portion 32, according to an FM method. The AM modulating portion 36 is arranged to modulate the digital signal encoded by the FM encoding portion 34, according to an AM method. The sampling-frequency oscillating portion 38 is arranged to generate a sampling frequency for the transmission-signal D/A converting portion 18 and the received-signal A/D converting portion 40. The AM demodulating portion 40 is arranged to demodulate the received signal received by the transmitter/receiver antenna 24, according to the AM method, for generating an AM demodulated wave. The FM decoding portion 42 is arranged to decode the AM demodulated wave generated by the AM demodulating portion 40, according to the FM method. The reply-bit-string interpreting portion 44 is arranged to interpret the decoded signal generated by the FM decoding portion 42, and to read out the information relating to the modulation by the radio-frequency identification tag 14.

Figure 2:
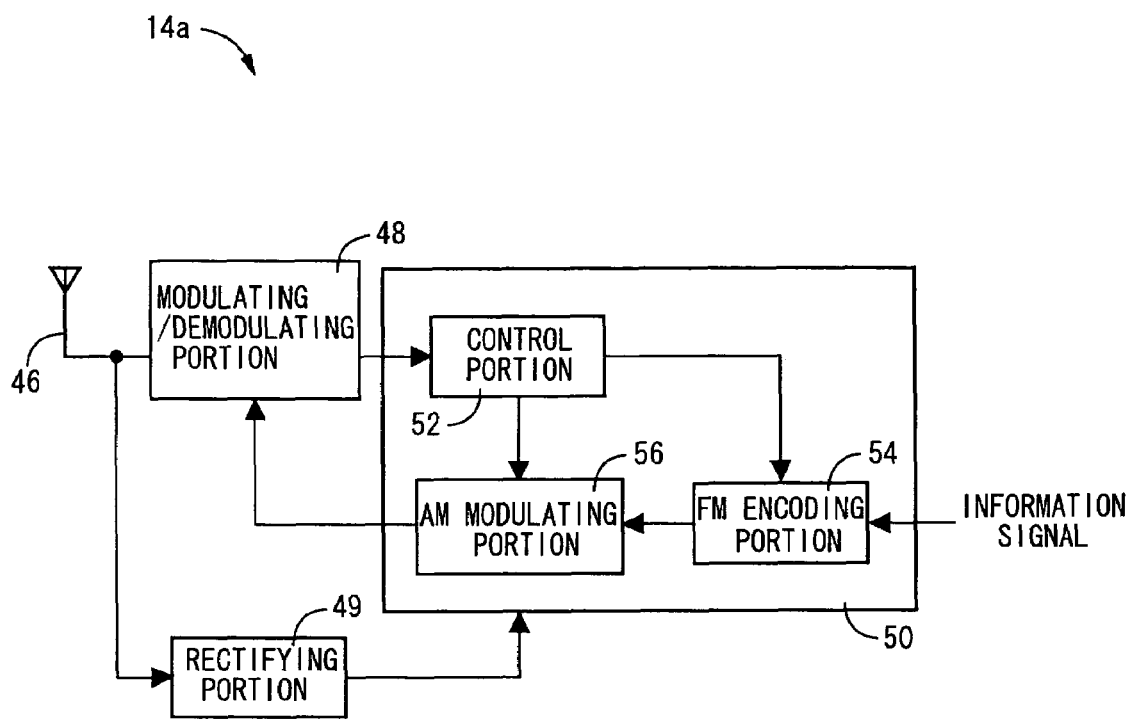
FIG. 2 is a block diagram showing an arrangement of a radio-frequency identification tag circuit provided on a radio-frequency identification tag shown in FIG. 1.

Referring to the block diagram of FIG. 2, there is shown an arrangement of a radio-frequency identification tag circuit 14a provided in the radio-frequency identification tag 14. This radio-frequency identification tag circuit 14a is arranged to receive the transmission signal in the form of the transmission wave $F_{r1}$ transmitted from the radio-frequency identification tag communication device 12, and a transmitter/receiver antenna 46, a modulating/demodulating portion 48, a rectifying portion 49, and an IC circuit portion 50. The transmitter/receiver antenna 46 is arranged to receive the transmission signal in the form of the transmission wave $F_{c1}$ transmitted from the radio-frequency identification tag communication device 12, and to transmit the reply signal in the form of the reflected wave $F_{r1}$. The modulating/demodulating portion 48 is connected to the transmitter/receiver antenna 46, and arranged to effect signal modulation and demodulation. The rectifying portion 49 is arranged to rectify a portion of the transmission wave $F_{c1}$ received by the transmitter/receiver antenna 46, and to provide the IC circuit portion 50 with an electric energy. The IC circuit portion 50 is arranged to effect digital signal processing operations, using the transmission wave $F_{c1}$ rectified by the rectifying portion 49, as an energy source. The IC circuit portion 50 includes a control portion arranged to control the radio-frequency identification tag circuit 14a, an FM encoding portion 54 arranged to encode the predetermined information according to the FM method, and an AM modulating portion 56 arranged to modulating the information signal encoded by the FM encoding portion 54, according to the AM method. It will be understood that the radio-frequency identification tag 14 is a so-called passive tag not including an internal power source.

A communicating operation of the RFID communication system 10 constructed as described above is initiated with generation of a digital signal by the transmission-bit-string generating portion 32 of the radio-frequency identification tag communication device 12. Then, the digital signal generated by the transmission-bit-string generating portion 32 is encoded by the FM encoding portion 34. Subsequently, the encoded signal generated by the FM encoding portion 34 is AM-modulated by the AM modulating portion 34. Then, the digital transmission signal modulated by the AM modulating portion 36 is converted into an analog signal by the transmission-signal D/A converting portion 18. The frequency of the analog transmission signal generated by the transmission-signal D/A converting portion 18 is then increased by the up converter 22, by the amount equal to the frequency of the frequency conversion signal generated by the frequency-conversion-signal output portion 20. This analog transmission signal is applied to the transmitter/receiver antenna 24 through the directional coupler 26. The transmission wave $F_{c1}$ is transmitted from the transmitter/receiver antenna 24 toward the radio-frequency identification tag 14.

The transmission wave $F_{c1}$ transmitted from the transmitter/receiver antenna 24 of the radio-frequency identification tag communication device 12 and received by the transmitter/receiver antenna 46 of the radio-frequency identification tag 14 is demodulated by the modulating/demodulating portion 48, and a portion of the received transmission wave $F_{c1}$ is rectified by the rectifying portion 49 into an electric energy by which the IC circuit portion 50 is operated. The above-indicated predetermined information is encoded by the FM encoding portion 54, and AM-modulated by the AM modulating portion 56. The transmission signal $F_{c1}$ is modulated by the modulating/demodulating portion 48 according to the AM-modulated signal generated by the AM modulating portion 56, to generate the reflected wave $F_{r1}$ which is transmitted from the transmitter/receiver antenna 46 toward the radio-frequency identification tag communication device 12.

The reflected wave $F_{r1}$ transmitted from the transmitter/receiver antenna 46 of the radio-frequency identification tag 14 and received by the transmitter/receiver antenna 24 of the radio-frequency identification tag communication device 12 is applied as the received signal to the down converter 28 through the directional coupler 26, so that the frequency of the received signal is reduced by the amount equal to the frequency of the frequency conversion signal generated by the frequency-conversion-signal output portion 20. The received signal the frequency of which has been reduced by the down converter 28 is then converted by the received-signal A/D converting portion 30, into a digital signal. The digital received signal generated by the received-signal A/D converting portion 30 is demodulated by the AM demodulating portion 40. The AM-demodulated signal generated by the AM demodulating portion 40 is then decoded by the FM decoding portion 42. Then, the decoded signal generated by the FM decoding portion 42 is interpreted by the response-bit-string interpreting portion 44, to read out the information regarding the modulation by the radio-frequency identification tag 14.

Figure 3:
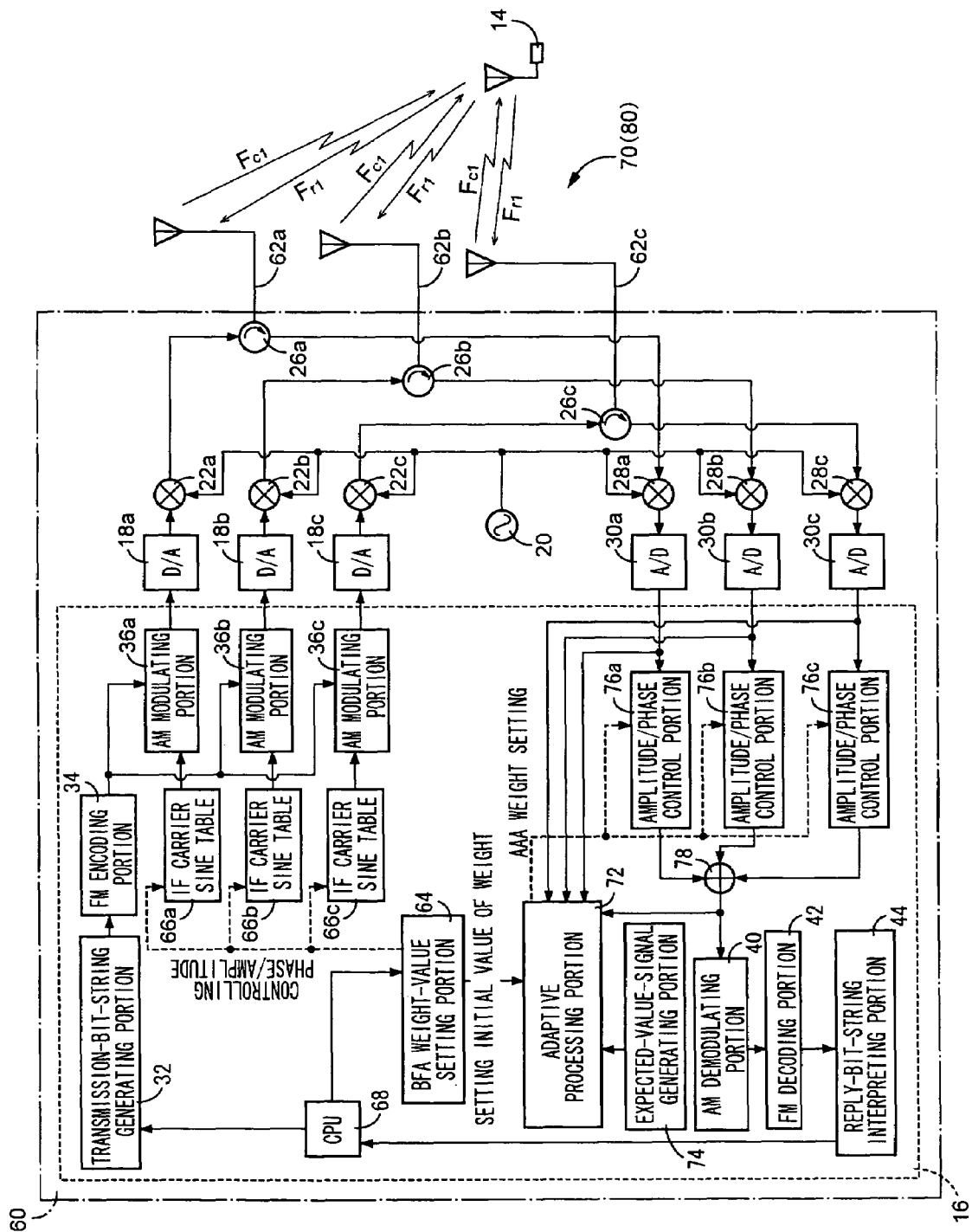
FIG. 3 is a view showing an electric arrangement of a radio-frequency identification tag communication device according to one embodiment of the present invention.

Referring to FIG. 3, there will be explained an electric arrangement of a radio-frequency identification tag communication device 60 constructed according to one embodiment of this invention. In the following description of the radio-frequency identification tag communication device 60, the same reference signs as used in FIG. 1 showing the conventional radio-frequency identification tag communication device 12 will be used to identify the same elements, redundant description of which is not provided.

As shown in FIG. 3, the radio-frequency identification tag communication device 60 of the present embodiment includes a plurality of transmitter/receiver antenna elements 62a, 62b, 62c arranged to transmit the transmission signal toward the radio-frequency identification tag 14 and receive the reply signal transmitted from the radio-frequency identification tag 14 in response to the transmission signal. These antenna elements 62a, 62b, 62c will be collectively referred to as the antenna elements 62, unless otherwise specified. These antenna elements 62 are di-pole antennas operable independently of each other, and cooperate to constitute an array antenna. Generally, an array antenna the directivity of which is controlled by changing the phase of a signal corresponding to each antenna element is referred to as a phased array antenna, while an array antenna the directivity of which is controlled by changing the phase and amplitude of the signal is referred to as a beam forming antenna. The radio-frequency identification tag communication device 60 is provided with a plurality of elements (preferably corresponding to the respective three antenna elements 62) corresponding to each of selected ones of the components provided in the conventional radio-frequency identification tag communication device 12. Namely, the DSP 16 of the communication device 60 is provided with functional components including; a plurality of AM modulating portions 36a, 36b, 36c arranged to modulate the coded signal generated by the FM encoding portion 34, independently of each other; a plurality of transmission-signal D/A converting portions 18a, 18b, 18c arranged to convert the transmission signals modulated by the AM modulating portions 36, into analog signals; a plurality of up converters 22a, 22b, 22c arranged to increase the frequencies of the analog transmission signals generated by the transmission-signal D/A converting portions 18, by an amount equal to the frequency of the frequency conversion signal generated by the frequency-conversion-signal output portion 20; a plurality of down converters 28a, 28b, 28c arranged to reduce the frequencies of the received signals received by the plurality of antenna elements 62, by an amount equal to the frequency conversion signal generated by the frequency-conversion-signal output portion 20; a plurality of transmission/reception separating portions in the form of isolators or directional couplers 26a, 26b, 26c arranged to supply the antenna elements 63 with the transmission signals the frequencies of which have been increased by the respective up converters 22, and to supply the down converters 28 with the transmission signals received by the respective antenna elements 62; and a plurality of received-signal A/D converting portions 30a, 30b, 30c arranged to convert the received signals the frequencies of which have been reduced by the respective down converters 28, into digital signals to be applied to the DSP 16. It is noted that FIG. 3 does not show a sampling-frequency oscillating portion for generating the sampling frequency for the plurality of transmission-signal D/A converting portions 18 and the plurality of received-signal A/D converting portions 30.

The DSP 16 of the radio-frequency identification tag communication device 60 is further provided with functional components including: a BFA (beam forming antenna) weight-value setting portion 64 functioning as a directivity control portion; a plurality of IF carrier sine tables 66a, 66b, 66c (hereinafter collectively referred to as IF carrier sine tables 66, unless otherwise specified); and a CPU 68 for controlling the transmission-bit-string generating portion 32 and the BFA weight-value setting portion 64. The directivity control portion in the form of the BFA weight-value setting portion 64 is arranged to control the directivity of a transmission antenna 70 constituted by the plurality of antenna elements 62, by controlling the phase and/or the amplitude of each of the transmission signals to be transmitted from the antenna elements 62. In the present embodiment, both of the phase and amplitude of the transmission signals are controlled by the BFA weight-value setting portion 64. The IF carrier sine tables 66 are arranged to supply the plurality of AM modulating portions 36 with respective carrier signals the phase and amplitude of which have been controlled according to a command from the BFA weight-value setting portion 64. The phase of the carrier signal is changed depending upon the position of each IF carrier sine table 66 from which a value is read out, and the amplitude of the carrier signal is changed by multiplying the read-out value by a predetermined value. The plurality of Am modulating portions 36 are arranged to modulate the encoded signals according to transmission bit strings of the carrier signals which are received from the respective IF carrier sine tables 66 and the phase and amplitude of which have been controlled. The phase and amplitude of the transmission signals to be transmitted from the respective antenna elements 62 can be changed according to the weight value set in the BFA weight-value setting portion 64, so that the directivity of a composite signal of the transmission signals can be controlled. That is, the transmission antenna 70 functions as a so-called "phased-array control portion" or "beam-forming control portion".

The DSP 16 of the radio-frequency identification tag communication device 60 is further provided with functional components including: an adaptive processing portion 72 functioning as an adaptive weight control portion, an expected-value-signal generating portion 74, a plurality of amplitude/phase control portions 76a, 76b, 76c (hereinafter collectively referred to as amplitude/phase control portions 76, unless otherwise specified), and a signal synthesizing portion 78. The adaptive weight control portion in the form of the adaptive processing portion 72 is arranged to effect an adaptive control of a weight to be given to the received signal received by each of the plurality of antenna elements 62, on the basis of the reply signal transmitted from the radio-frequency identification tag 14. The expected-value-signal generating portion 74 is arranged to supply the adaptive processing portion 72 with a predetermined expected-value signal. The amplitude/phase control portions 76 is arranged to control the phase and amplitude of the received signal received by each of the antenna elements 62, according to a control value received from the adaptive processing portion 72. The signal synthesizing portion 78 is arranged to combine together the received signals the amplitude and phase of which have been controlled by the respective amplitude/phase control portions 76. The plurality of antenna elements 62 also constitute a receiver antenna 80 for receiving the reply signal from the radio-frequency identification tag 14. In the present embodiment, the adaptive processing portion 72, the expected-value-signal generating portion 74, the amplitude/phase control portion 76 and the signal synthesizing portion 78 cooperate to constitute an adaptive array control portion.

Preferably, the BFA weight-value setting portion 64 is arranged to change the directivity of the transmission antenna 70 in increments of a predetermined angle until a normal reply signal is received from the radio-frequency identification tag 14. Accordingly, the setting of the phase and amplitude by each of the IF carrier sine tables 66 is repeatedly updated.

Figure 4:
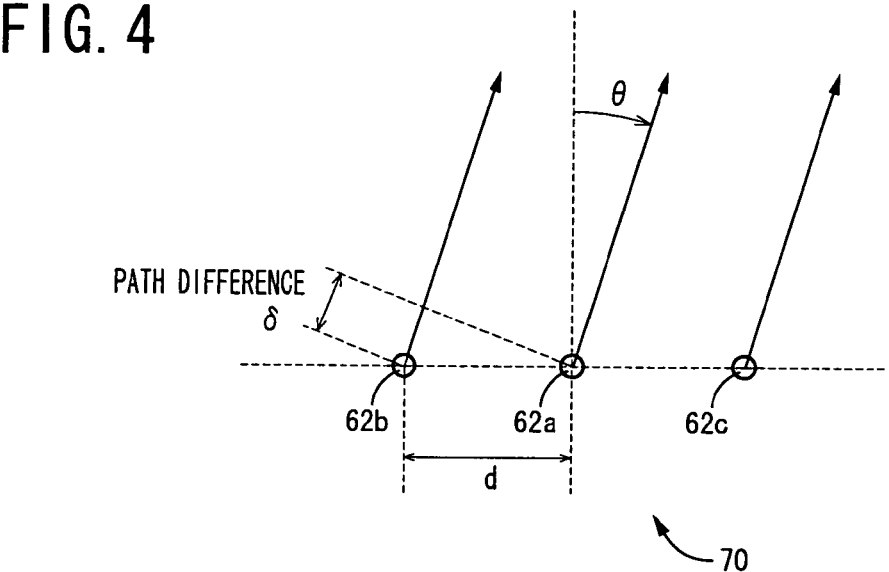
FIG. 4 is a view for explaining the principle of a phased-array operation of a transmitter antenna constituted by a plurality of antenna elements, which is provided in the radio-frequency identification tag communication device of FIG. 3.

FIG. 4 is a view for explaining the principle of a phased-array operation of the transmitter antenna 70 constituted by the plurality of antenna elements 62. As shown in FIG. 4, the three antenna elements 62a, 62b, 62c in the form of the di-pole antennas of the transmitter antenna 70 are spaced apart from each other by a predetermined spacing distance such that the three antenna-elements 62a, 62b, 62c extend in parallel with each other. For the transmitter antenna 70 to be able to radiate the transmission waves $F_{c1}$ in a direction which is inclined by an angle $\theta$ with respect to a normal to a plane defined by the antenna elements 62, an excitation voltage of each of the antenna elements 62 must be controlled such that there exists a phase difference corresponding to a path difference $\delta$. Where the transmission waves $F_{c1}$ to be radiated have a wavelength $\lambda$, and the spacing distance between the adjacent antenna elements 62 is equal to "d", for example, the path difference $\delta$ between the adjacent antenna elements 62 is equal to $d \cdot \sin\theta$. The phase of the transmission wave $F_{c1}$ corresponding to the path difference $\delta$ is equal to $2\pi \cdot (\delta/\lambda)$. When the phase of the excitation voltage to be applied to the antenna element 62b is advanced by $2\pi \cdot (\delta/\lambda)$ with respect to that of the excitation voltage to be applied to the antenna element 62a selected as a reference, while the phase of the excitation voltage to be applied to the antenna element 62c is retarded by $2\pi \cdot (\delta/\lambda)$ with respect to that of the excitation voltage to be applied to the antenna element 62a, the transmission waves $F_{c1}$ radiated by the antenna elements 62 cooperate to have the highest intensity in the direction indicated by the angle $\theta$ in FIG. 4, and the directivity of the transmitter antenna 70 is set in the direction indicated by the angle $\theta$. Where the transmission waves Fc1 having a frequency of 905[Mhz] are radiated, where $d=\lambda/2$, and $\theta=20[°]$, the wavelength $\lambda$ is equal to 331.26[mm], so that the phase difference of the excitation voltages of the adjacent antenna elements 62 is equal to $2\pi \cdot (d \cdot \sin\theta)/\lambda = 1.0745$[radian].

Figure 5:
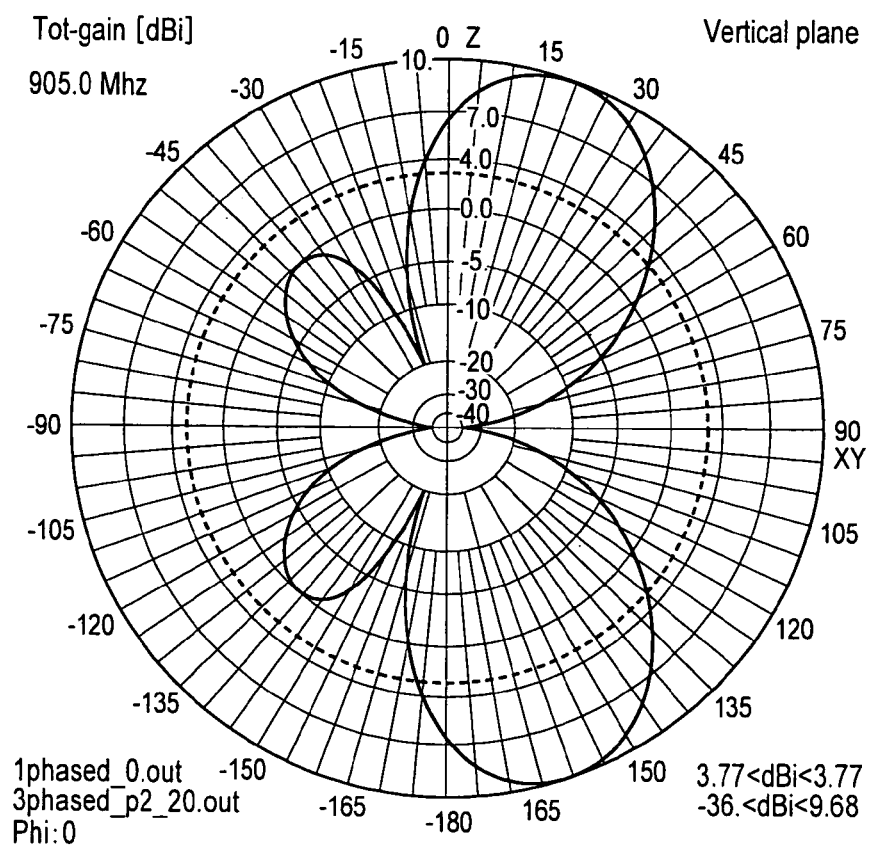
FIG. 5 is a view indicating an intensity of a transmission wave radiated from the transmitter antenna the directivity of which is set by a phased-array processing, the intensity varying with an angle of the radiation.
Figure 7:
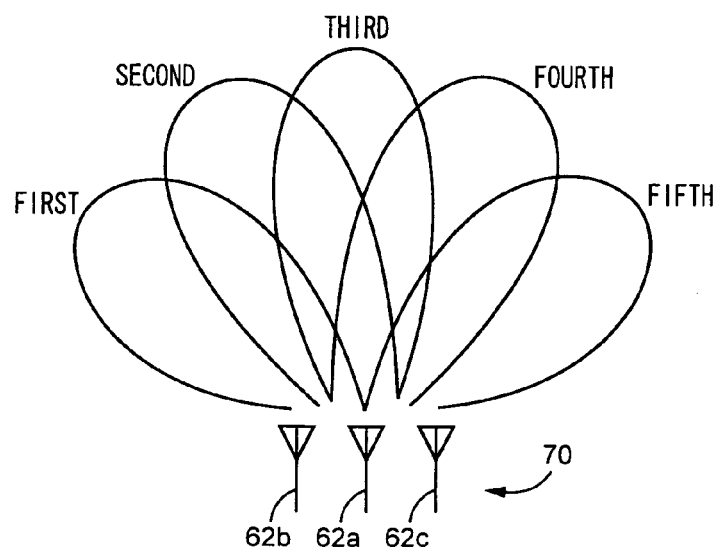
FIG. 7 is a view schematically indicating the radiation of the transmission waves from the transmitter antenna in different directions in the radio-frequency identification tag communication device of FIG. 3.

Referring to FIG. 5, there is indicated the intensity of the transmission wave $F_{c1}$ radiated from the transmitter antenna 70 the directivity of which is set in the direction of 20[°] by a phased-array processing, the intensity varying with the directional angle $\theta$ of radiation. In a chart like that of FIG. 5 indicating a change of the intensity of a wave with the directional angle of radiation from an antenna in general, each lobe indicating the maximum intensity of the wave is called a main lobe, and while the other lobes are called side lobes, while minimal points between the lobes are called null points. A circle indicated by broke line in FIG. 5 indicates the intensity of 3.77[dB] of the transmission wave $F_{c1}$ where the phased-array processing is not effected. It will be understood that the intensity of the transmission wave $F_{c1}$ radiated from the transmitter antenna 70 the directivity of which is set in the direction of 20[°] by the phased-array processing is higher by about 6[dB] than that of the transmission wave $F_{c1}$ radiated from the transmitter antenna 70 where the directivity is not set in the direction of 20[°] by the phased-array processing. In the directions other than the direction of 20[°], the intensity is lower than that where the directivity of the antenna 70 is not set by the phased-array processing. In this respect, it is desirable to change the directional angle $\theta$ of radiation of the transmission wave $F_{c1}$, so that the transmission wave $F_{c1}$ is repeatedly transmitted in the different directions, to permit radio communication with the plurality of radio-frequency identification tags 14 located in different direction. For instance, the transmission wave $F_{c1}$ is transmitted five times while the directional angle $\theta$ of radiation of the transmission wave $F_{c1}$ is changed in increments of 30[°] from −60[ ]to 60[°], as indicated in FIG. 7, so that one of the five directional angles $\theta$ which permits reception of a normal reply signal from the radio-frequency identification tag 14 is selected, to maximize the distance of communication. Although the phased-array processing is effected for the three antenna elements 62 in the present embodiment, the directivity of the transmitter antenna can be increased by effecting the phased-array processing for a larger number of antenna elements 62.

Figure 6:
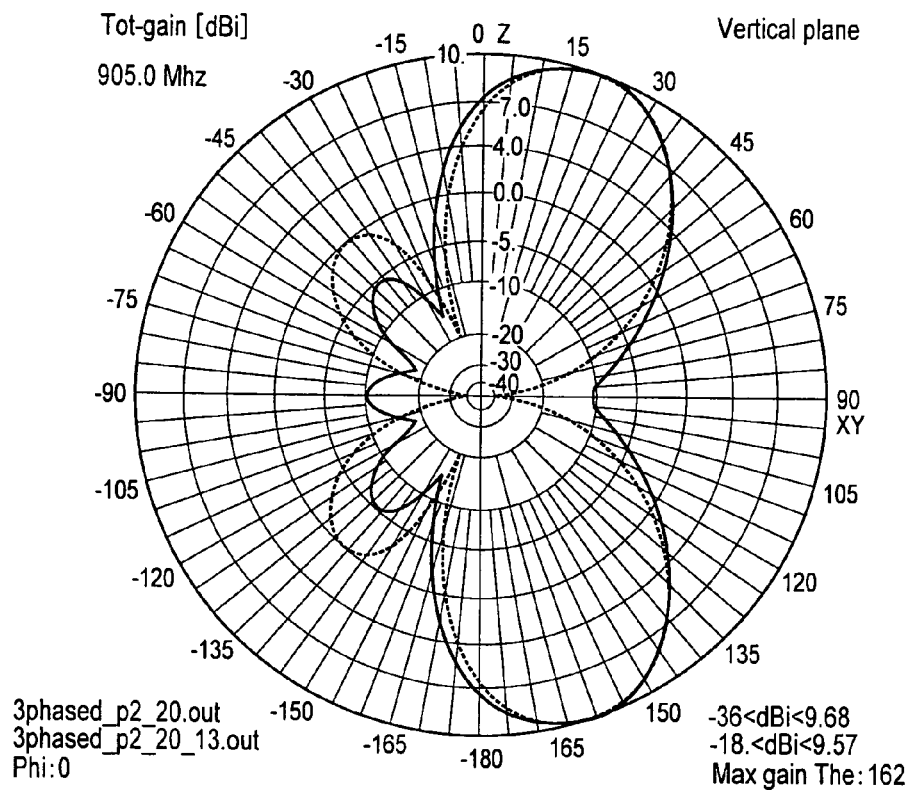
FIG. 6 is a view indicating an intensity of a transmission wave radiated from the transmitter antenna the directivity of which is set by a BFA processing, the intensity varying with the angle of the radiation.

Referring to FIG. 6, there is indicated the intensity of the transmission wave $F_{c1}$ radiated from the transmitter antenna 70 the directivity of which is set by a BFA (beam forming antenna) processing, the intensity varying with the directional angle θ of radiation. Where the phase and amplitude (gain) of the transmission signals transmitted from the respective antenna elements 62 are controlled by the BFA processing, the directional angles of the main lobes are similar to those of the main lobes (indicated by broken lines in FIG. 6) in the case of the phased-array processing in which only the phase of the transmission signals is controlled by the phased-array processing, but the configurations of the side lobes are different from those of the side lobes in the case of the phased-array processing. In the specific case of FIG. 6, the gains of the antenna element 62a, 62b and 62c are respectively controlled to be 1.3, 1.0 and 0.8 times that in the case of the phased-array processing, while the directional angle θ main lobe remains to be 20[°], so that the sizes of the side lobes in the directional angles of −45[°] and −90[°] and the directions of the null points are changed with respect to those in the case of the phased-array processing.

Figure 8:
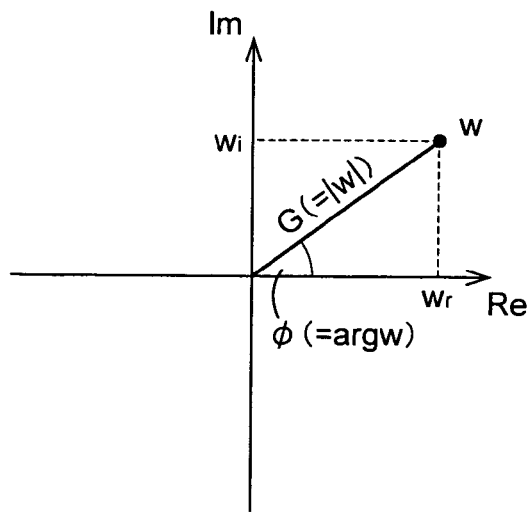
FIG. 8 is a view indicating parameters relating to amplitude and phase controls, as a complex weight.

FIG. 8 is a view indicating parameters relating to the amplitude and phase controls, as a complex weight. The parameters relating to the amplitude and phase controls are considered to be an amplitude gain G (=|w|) and a phase angle φ(=argw) which are defined in a polar coordinate system and which are represented by a point on a complex plane, as indicated in FIG. 8. Where the complex weight is represented by "w" (=Wr+jWi), equations Wr=G·cos φ, and Wi=G·sin φ are satisfied. Conversely, if the complex weight w is known, the phase angle φ that must be changed relating to the phase control is equal to $\tan^{-1}$(Wi/Wr), and the amplitude gain G that must be changed relating to the amplitude control is equal to sqrt(Wr^2+Wi^2).

The complex weights to be given to the received signals received by the respective antenna elements 62 can be set by either an open-loop control method or a closed-loop control method. In the open-loop control method, the complex weights w are set by setting the directivity of the receiver antenna 80 in a predetermined direction. In the closed-loop control method, the complex weights w are set by setting the directivity of the receiver antenna 80 depending upon the direction in which the electromagnetic wave is actually received. In an AAA (adaptive array antenna) processing, an output waveform and a waveform of an expected-value signal are compared with each other to obtain an error, which is fed back to minimize a root mean square of the error, for effecting a closed-loop control in which the complex weight w is converged into an optimum value. An algorithm generally used for convergence of the weight is well known as LMS (Least Mean Square) and RLS (Recursive Least Squares).

Figure 9:
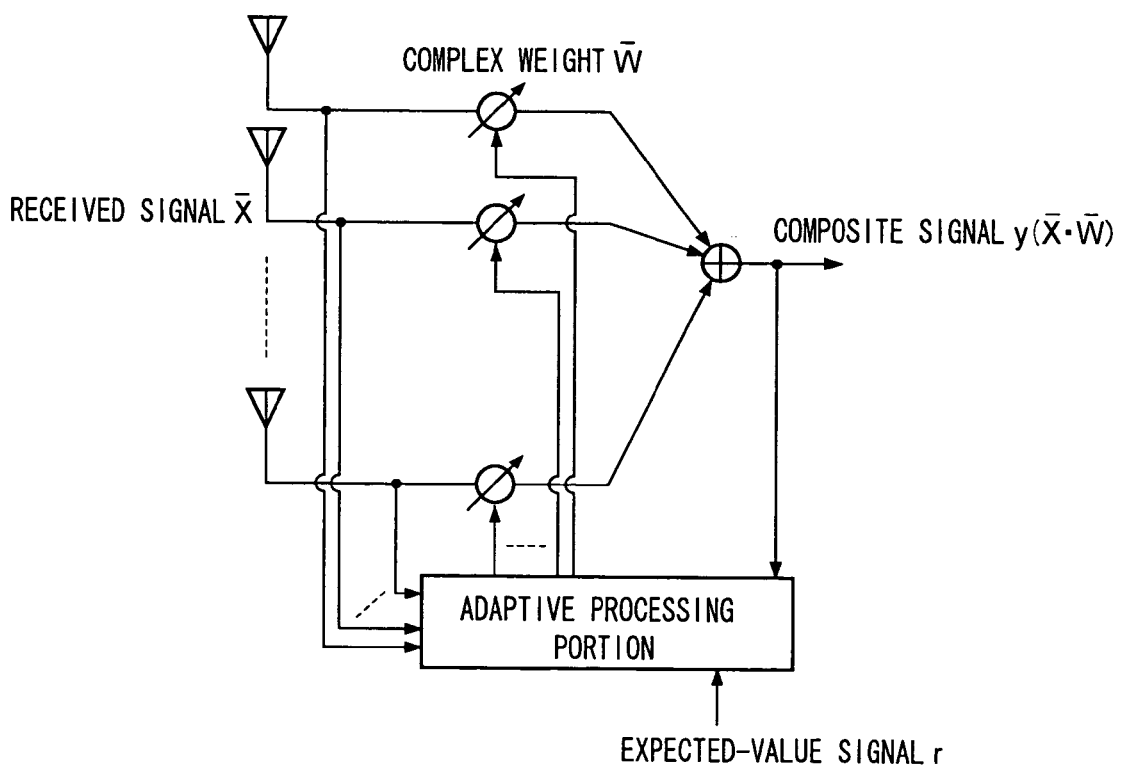
FIG. 9 is a view schematically indicating a closed loop of AAA processing.

FIG. 9 schematically indicates a closed loop of the AAA processing. An error signal e is represented by r−y (=r−X·W), wherein "X", "W", "y" and "r" respectively represent a vector of the received signal received by each of a plurality of receiver antenna, a vector of the complex weight to be given to each received signal, a composite signal (scalar) synthesized by combining together the received signals to which the weights have been given, and the expected-value signal (scalar). In the AAA processing shown in FIG. 9, the feedback control is implemented to minimize the root mean square |e₂| of the error signal e, so that the complex weight vector W can be converged into the optimum value. It is noted that the expected-value signal (reference signal) r used for the closed loop need not have the waveform of the received signal per se. For example, where the received signal is an FM code, the AAA processing is possible by using a change timing of the FM code as the expected value, even where the waveform of the received signal is unknown. The closed loop control may be implemented so as to minimize an interference signal used as the reference signal.

The adaptive processing portion 72 is preferably arranged to determine the weight to be given to each received signal by the AAA processing, and to effect the feedback control so as to minimize the root mean square of an error between the expected-value signal generated by the expected-value-signal output portion 74, and a composite signal synthesized by the signal synthesizing portion 78 by combining together the received signals which have been received by the respective antenna elements 62 and to which the predetermined weights have been given.

According to the algorithm such as the LMS and RLS described above, a suitable value is set as an initial value of the complex weight w, and the complex weight w is converged into the optimum value according to the input signal. The time required for the complex weight w to be converged into the optimum value varies with the initial value of the complex weight w. If the initial value set is close to the optimum value, the time required for the convergence of the complex weight w is relatively short. Since it is usually impossible to set the initial value of the complex weight w close to the optimum value, the initial value of the complex weight w is set to set the directivity of the receiver antenna 80 in the initial directional angle (e.g., 0°) of radiation.

Figure 10:
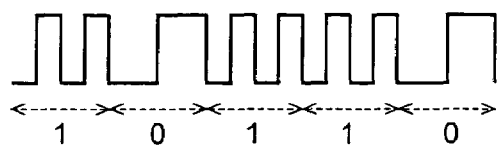
FIG. 10 is a view indicating an example of an FM code encoded by an FM encoding portion provided in the radio-frequency identification tag communication device of FIG. 3.

There will next be described an operation of the radio-frequency identification tag communication device 60 to communicate with the radio-frequency identification tag 14. Initially, a suitable command requesting the transmission of the transmission signals to the radio-frequency identification tag 14 is set by the CPU 68, in the transmission-bit-string generating portion 32 of the radio-frequency identification tag communication device 60. When the transmission-bit-string generating portion 32 is commanded by the CPU 68 to initiate the transmission of the transmission signal, a digital signal is generated by the transmission-bit-string generating portion 32, which is then encoded by the FM encoding portion 34. FIG. 10 indicates an example of the FM code encoded by the FM encoding portion 34. This FM code causes a change of one period within one bit time when the original bit is 0, and a change of two periods within the one bit time when the original bit is 1. The conversion of the transmission signal into the FM code facilitates separation of the transmission signals from noises. Then, the carrier signals the phase and amplitude of which have been controlled are supplied from the plurality of ID carrier sine tables 66 to the AM modulating portions 36, so that the FM-encoded signal generated by the FM encoding portion 34 is AM-modulated by the AM modulating portions 36, on the basis of the carrier signals. The digital transmission signals generated by the respective AM modulating portions 36 are converted into analog signals by the transmission-signal D/A converting portions 18. The frequencies of the analog transmission signals generated by the transmission-signal D/A converting portions 18 are increased by the respective up converters 22, by an amount equal to the frequency of the frequency conversion signal generated by the frequency-conversion-signal output portion 20. Then, the analog transmission signals are applied to the respective antenna elements 62 through the respective directional couplers 26, so that the transmission waves $F_{c1}$ are transmitted from the antenna elements 62 toward the radio-frequency identification tag 14.

Figure 11:
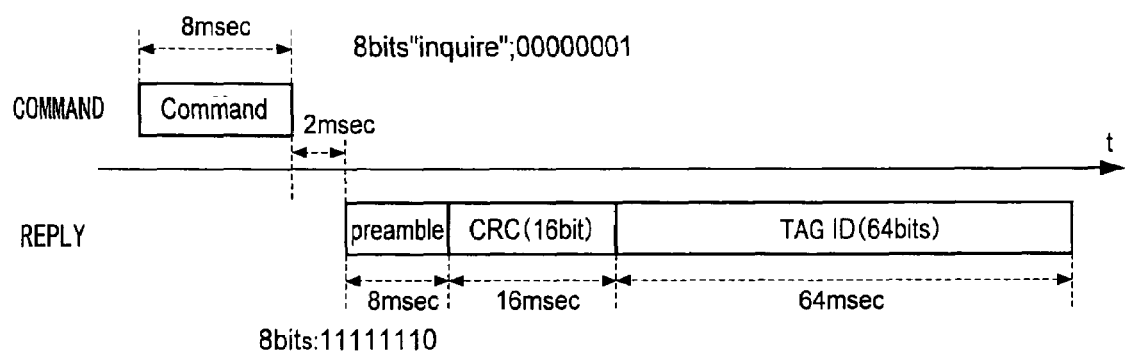
FIG. 11 is a view indicating a relationship between a timing of reception of an "inquire" command by the radio-frequency identification tag of FIG. 2 to read ID data therefrom, and a timing of transmission of a bit string in response to the "inquire" command.

FIG. 11 is a view indicating a relationship between a timing of reception of an "inquire" command by the radio-frequency identification tag 14 to read ID data therefrom, and a timing of transmission of a bit string in response to the "inquire" command. When the transmission wave $F_{c1}$ transmitted from the transmitter antenna 70 of the radio-frequency identification tag communication device 60 is received by the transmitter/receiver antenna 46 of the radio-frequency identification tag 14, the received transmission wave $F_{c1}$ is demodulated by the modulating/demodulating portion 48. At the same time, a portion of the received transmission wave $F_{c1}$ is rectified by the rectifying portion 49, into an energy by which the predetermined information is encoded by the FM encoding portion 54. The FM-encoded signal generated by the FM encoding portion 54 is AM-modulated by the AM modulating portion 56. In the example shown in FIG. 11 wherein the bit rate is 1[kbps], the transmission of 1[bit] requires 1[ms]. The control portion 52 of the radio-frequency identification tag 14 is arranged to initiate a reply 2[ms] after the moment of reception of the "inquire" command. The reply has a preamble in its leading section, so that the radio-frequency identification tag communication device 60 is able to distinguish the reply from noises, when the demodulated signal interpreted by the communication device 60. The preamble has another function of allowing a sufficient time for convergence of the weight in the AAA processing in the communication device 60. The AAA processing is preferably arranged to complete the convergence of the weight within a time period of the preamble. The signal modulated by the Am modulating portion 56 and AM modulating/demodulating portion 48 of the radio-frequency identification tag 14 is transmitted as the reply signal in the form of the reflected wave $F_{r1}$ from the transmitter/receiver antenna 46, toward the radio-frequency identification communication device 60.

Figure 12:
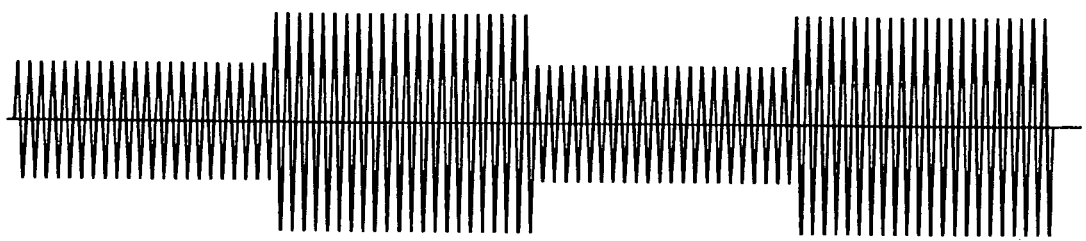
FIG. 12 is a view showing an example of a portion of a waveform of an expected-value signal corresponding to a preamble waveform of the bit string indicated in FIG. 11.

The reflected wave $F_{r1}$ transmitted from the transmitter/receiver antenna 46 of the radio-frequency identification tag 14 and received by the receiver antenna 80, that is, by each of the plurality of antenna elements 62 of the radio-frequency identification tag communication device 60 is applied to the corresponding down converter 28 through the corresponding directional coupler 26, so that the frequencies of the reflected waves Fr1 received by the respective down converters 28 are reduced by an amount equal to the frequency of the frequency conversion signal generated by the frequency-conversion-signal output portion 20. The received signals the frequencies of which have been reduced are converted by the respective received-signal A/D converting portions 30, into digital signals the phase and amplitude of which are controlled by the respective amplitude/phase control portions 76, according to the control value received from the adaptive processing portion 72. The expected-value signal generated by the expected-value-signal output portion 74 has the same waveform as the AM-modulated wave generated by the AM modulating portions 36, for example. Where the preamble waveform is "11111110" as shown in FIG. 11, the expected-value signal is a succession of seven repetitions of a waveform shown in FIG. 12.

The adaptive processing portion 72 is preferably arranged to set the initial value of the weight to be given to each received signal, on the basis of the directivity of the transmitter antenna 70 set by the BFA weight-value setting portion 64. As described above, the time required for convergence of the weight in the AAA processing can be shortened by setting the initial value of the weight at a value close to the optimum value into which the weight is to be eventually converged. In the usual closed-loop control, it is impossible to set the initial value of the weight close to the optimum value. In the radio-frequency identification tag communication device 60 of the present embodiment arranged to communicate with the radio-frequency identification tag 14 existing in the predetermined direction, it is possible to set the initial value of the weight close the optimum value, by reference to the directivity of the transmitter antenna 70 set by the BFA weight-value setting portion 64, unless the position of the radio-frequency identification tag 14 at the moment of transmission of the transmission wave $F_{c1}$ is different from that at the moment of reception of the reflected wave $F_{r1}$. Accordingly, the time required for convergence of the weight in the AAA processing by the adaptive processing portion 72 can be reduced.

After convergence of the adaptive control by the adaptive processing portion 72, the BFA weight-value setting portion 64 sets again the directivity of the transmitter antenna 70 on the basis of the weight which has been set by the adaptive control and which is to be given to each received signal. The radio-frequency identification tag communication device 60 repeats the operation to transmit the transmission signal and operation to receive the received signals. In the second and subsequent transmission and reception operations, reference is made to the weight into which the weight is converged by the adaptive control by the adaptive processing portion 72 implemented for the previous reception of the received signal. Thus, the directivity of the transmitter antenna 70 can be rapidly set in the direction in which the radio-frequency identification tag 14 in question exists.

Figure 19:
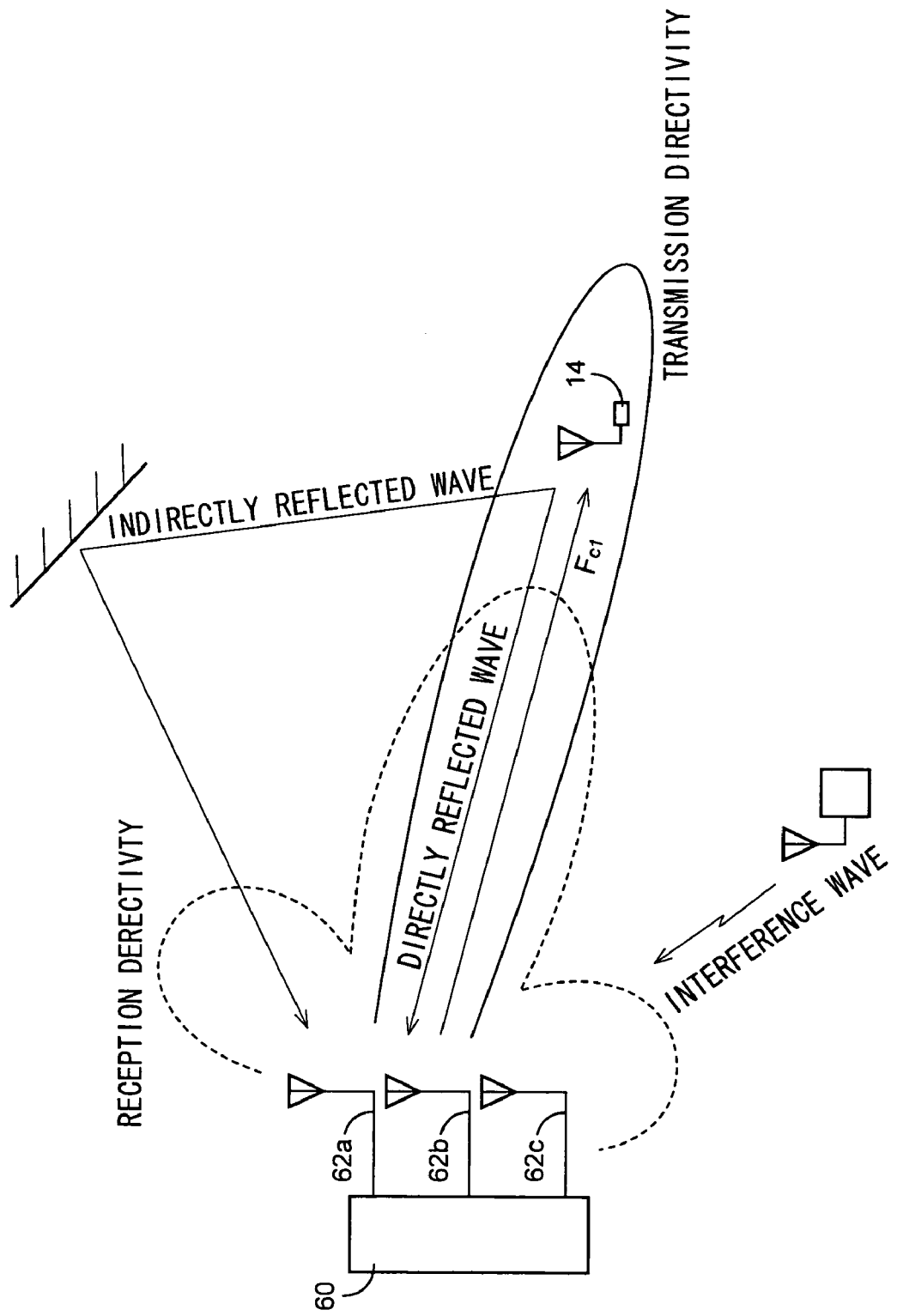
FIG. 19 is a view indicating communication of the radio-frequency identification tag communication device of FIG. 3 with the radio-frequency; identification tag of FIG. 2, where the transmission directivity and reception directivity are different from each other.

FIG. 19 is a view indicating communication of the radio-frequency identification tag communication device 60 with the radio-frequency identification tag 14, where the transmission directivity and reception directivity are different from each other. As described above, the transmission directivity is set on the basis of the BFA weight, in the direction toward the radio-frequency identification tag 14, as indicated by solid line in FIG. 19, so that the maximum distance of communication with the radio-frequency identification tag 14 can be increased. Further, the reception directivity is set by the AAA processing, so as to utilize the indirectly reflected wave as well as the directly reflected wave, and to align the direction of reception of an interference wave with the null direction, so that the sensitivity of reception is improved to further increase the maximum distance of communication with the identification tag 14. Thus, the transmission directivity and reception directivity of the present radio-frequency identification tag communication device 60 arranged to implement substantially concurrent signal transmission and reception are set differently with respect to each other, making it possible to effectively increase the maximum distance of communication as an interrogator.

After the phase and amplitude of the received signals are controlled by the respective amplitude/phase control portions 76, these received signals are combined together by the signal synthesizing portion 78, into the composite signal which is applied to the AM demodulating portion 40. The AM-demodulated wave generated by the AM demodulating portion 40 is decoded by the FM decoding portion 42. The decoded signal generated by the FM decoding portion 42 is interpreted by the reply-bit-string interpreting portion 44, so that the information relating to the modulation by the radio-frequency identification tag 14 can be read out.

Referring to the flow charts of FIGS. 13-16, there are illustrated major portions of an operation of the DSP 16 of the radio-frequency identification tag communication device 60 for communication with the radio-frequency identification tag 14. Control routines of these flow charts are repeatedly executed with an extremely short cycle time of several milliseconds to several tens of milliseconds.

Figure 13:
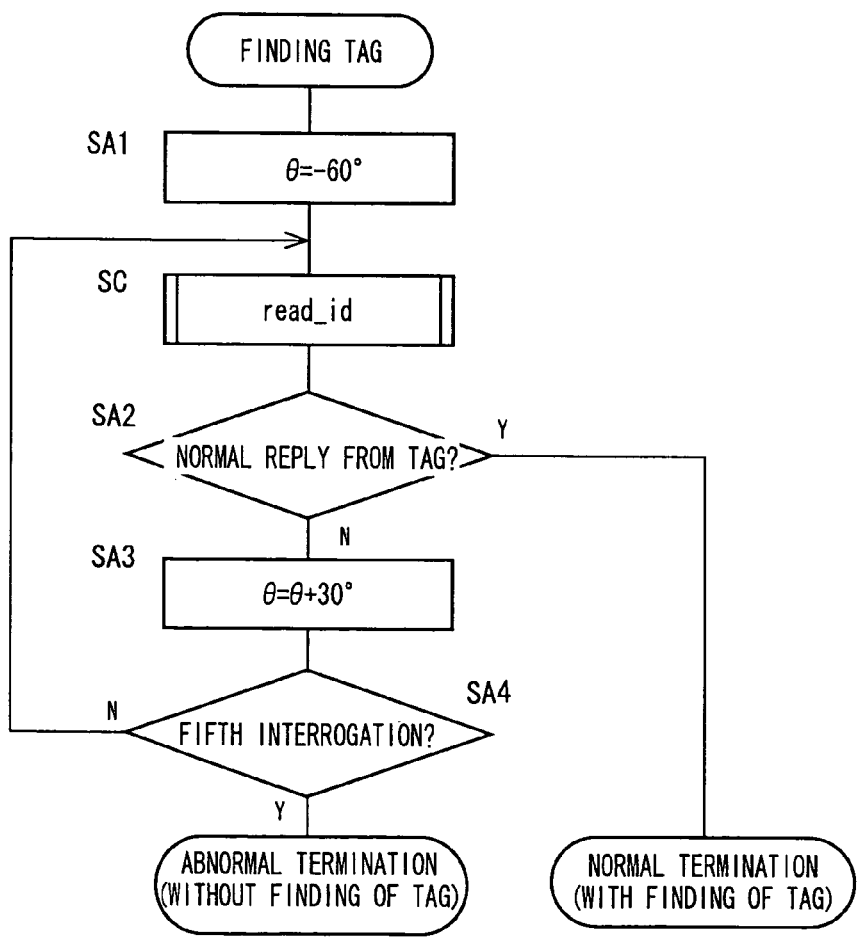
FIG. 13 is a flow chart illustrating a major portion of an operation of a DSP of the radio-frequency identification tag communication device of FIG. 3 for communication with the radio-frequency identification tag.
Figure 15:
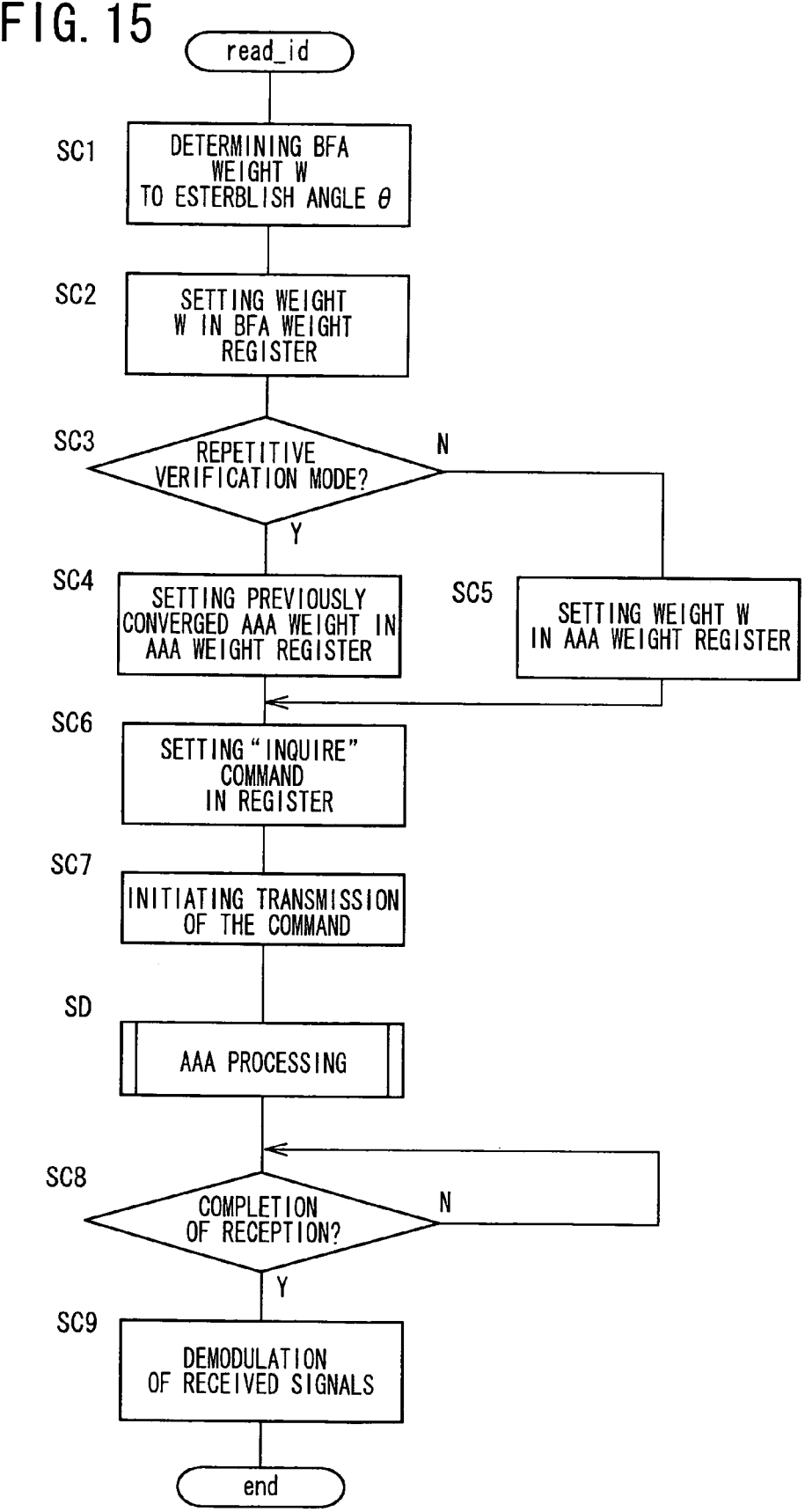
FIG. 15 is a flow chart illustrating a further major portion of the communicating operation of the DSP.

The routine illustrated in the flow chart of FIG. 13 is provided to find the radio-frequency identification tag 14 within the maximum distance of communication of the radio-frequency identification tag communication device 60. The present routine is initiated with step (hereinafter "step" being omitted) SA1 to set the directional angle θ corresponding to the direction of the radio-frequency identification tag 14, to an initial value (e.g., −60°). Then, SC is implemented to perform an operation to read out ID data from the radio-frequency identification tag 14, as shown in FIG. 15. SA2 is then implemented to determine whether a normal reply signal has been received from the radio-frequency identification tag 14. If an affirmative decision is obtained in SA2, this means that the radio-frequency identification tag 14 in question has been found, and one cycle of execution of the present routine is terminated with normal finding of the radio-frequency identification tag 14 in question. If a negative decision is obtained in SA2, the control flow goes to SA3 to increment the directional angle θ by a predetermined value (e.g., 30°), and then to SA4 to determine whether the present interrogation is the fifth interrogation to the radio-frequency identification tag 14. If a negative decision is obtained in SA4, the control flow goes back to SC and the subsequent steps. If an affirmative decision is obtained in SA4, the present routine is terminated with a failure to find the radio-frequency identification tag 14 in question.

Figure 14:
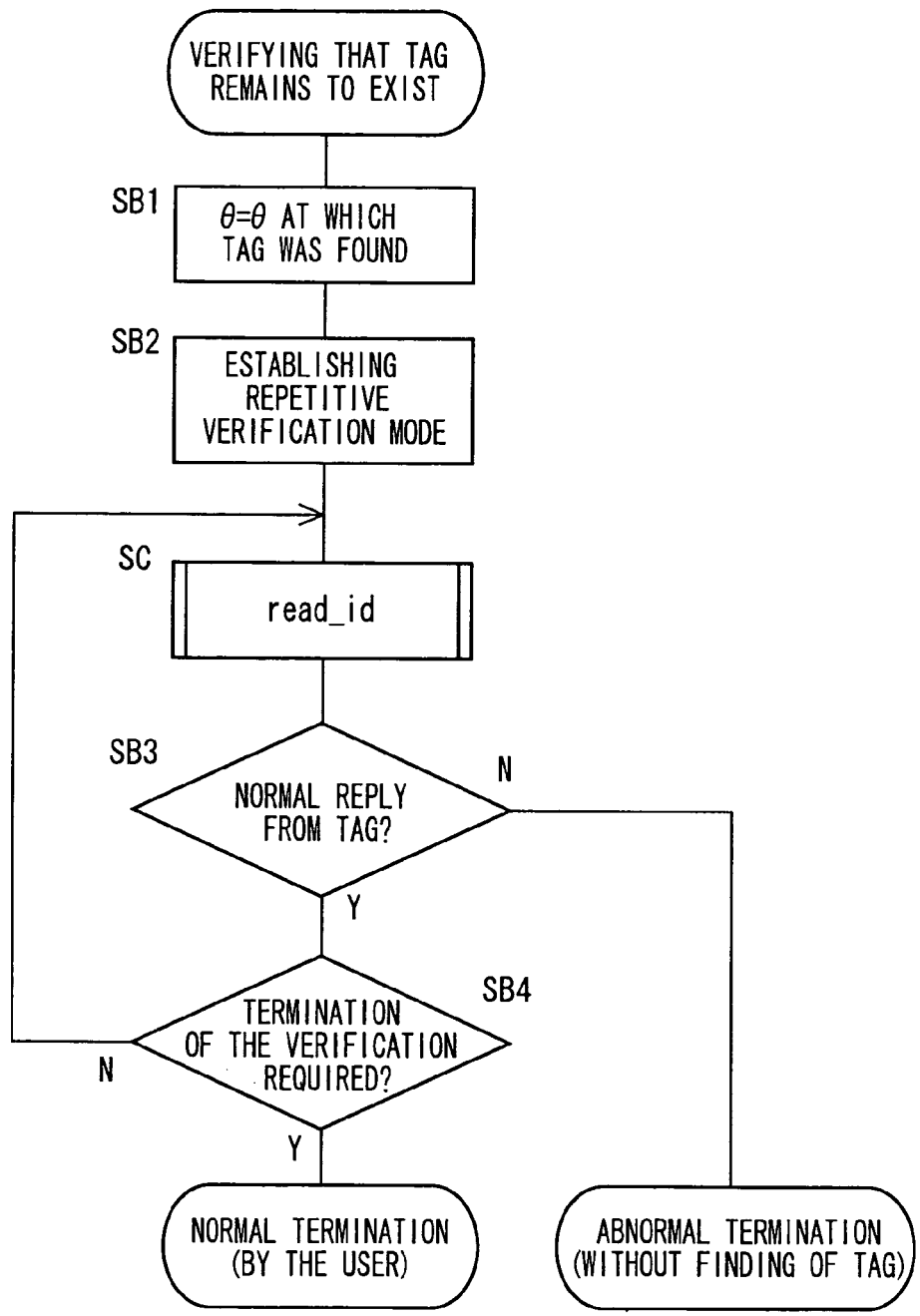
FIG. 14 is a flow chart illustrating another major portion of the communicating operation of the DSP.

The routine illustrated in the flow chart of FIG. 14 is provided to verify that the radio-frequency identification tag 14 found in the routine of FIG. 13 remains to exist within the maximum distance of communication of the radio-frequency identification tag communication device 60. The present routine is initiated with SB1 to set the directional angle θ corresponding to the direction of the radio-frequency identification tag 14, to the angle θ at which the identification tag 14 was found. Then, SB2 is implemented to establish a repetitive verification mode for determining whether the radio-frequency identification tag 14 remains to exist within the maximum distance of communication of the communication device 60. Then, the control flow goes to SC to perform the operation to read out the ID data from the radio-frequency identification tag 14, as shown in FIG. 15. SB3 is then implemented to determine whether the normal reply signal has been received from the radio-frequency identification tag 14. If a negative decision is obtained in SB3, the present routine is terminated with a failure to verify the existence of the radio-frequency identification tag 14 in question. If an affirmative decision is obtained in SB3, the control flow goes to SB4 to determine whether the termination of the determination as to whether the identification tag 14 remains to exist within the maximum distance of communication of the communication device 60 is required. If a negative decision is obtained in SB4, the control flow goes back to SC and the subsequent steps. If an affirmative decision is obtained in SB4, the present routine is terminated.

Figure 16:
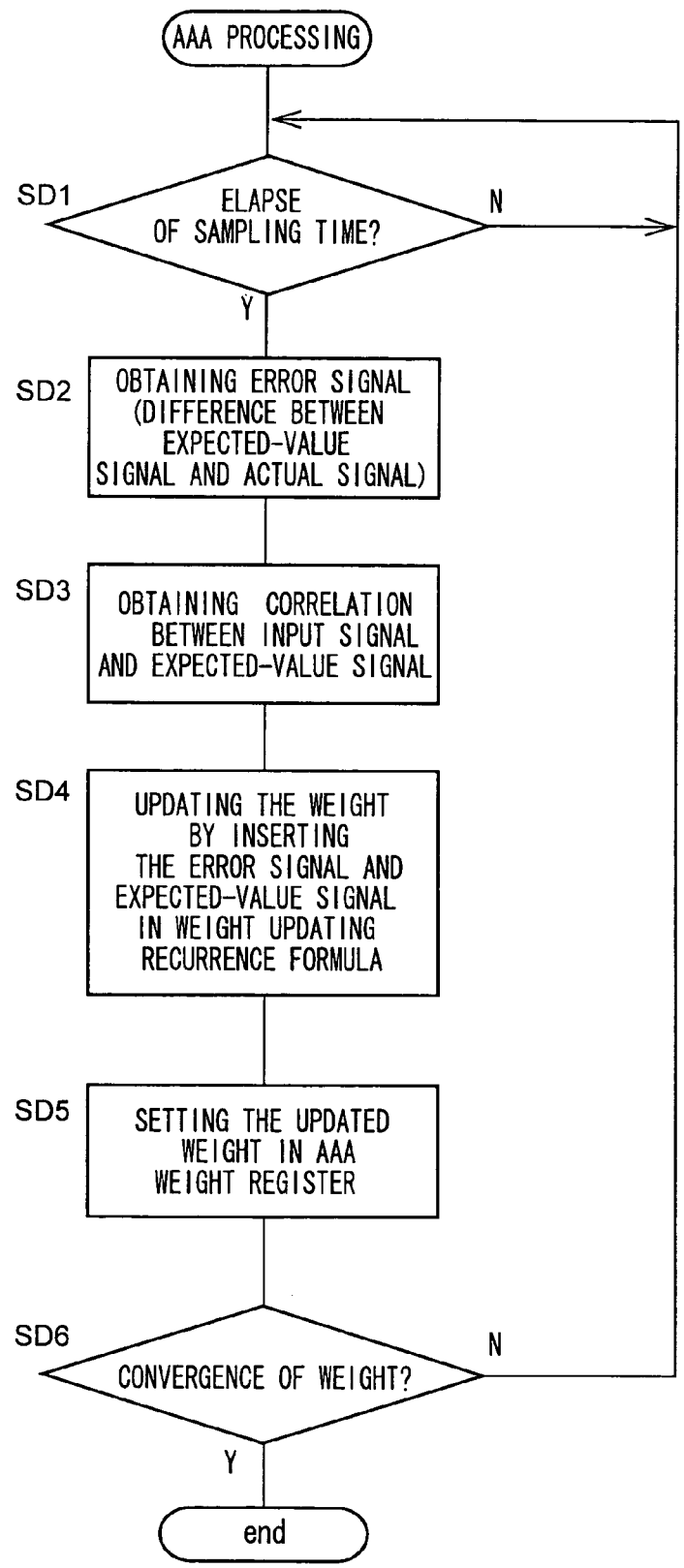
FIG. 16 is a flow chart illustrating a still further major portion of the communicating operation of the DSP.

The routine illustrated in the flow chart of FIG. 15 is provided to read out the ID data from the radio-frequency identification tag 14. The routine is initiated with SC1 to determine the BFA weight w to be given to each received signal, such that the directivity of the transmitter antenna 70 is set to establish the directional angle θ set in SA1 or SA3 of FIG. 13. Then, SC2 is implemented to set a BFA weight w determined in SC1, in a weight register of the BFA weight-value setting portion 64. The control flow then goes to SC3 to determine whether the repetitive verification mode is established to determine whether the radio-frequency identification tag 14 in question remains to exist within the maximum distance of communication of the radio-frequency identification tag communication device 60. If an affirmative decision is obtained in SC3, the control flow goes to SC4 in which an optimum AAA weight w into which the previous AAA processing by the adaptive processing portion 72 has been converged is again set in a weight register of the adaptive processing portion 72. SC6 and the subsequent steps are then implemented. If a negative decision is obtained in SC3, the control flow goes to SC5 to set the AAA weight w determined on the basis of BFA weight w set in SC2, in the weight register of the AAA processing portion 72. Then, SC6 is implemented to set the "inquire" command in the transmission-bit-string generating portion 32, for reading out the ID data from the radio-frequency identification tag 14. The control flow then goes to SC7 in which the CPU 68 commands the initiation of transmission of the "inquire" command. Accordingly, the digital signal generated by the transmission-bit-string generating portion 32 is FM-encoded by the FM encoding portion 34, and the FM-encoded signal is AM-modulated by the plurality of AM modulating portions 36. The AM-modulated signals are transmitted as the transmission waves $F_{c1}$ (transmission signals) from the transmitter antenna 70. Then, SD is implemented to perform the AAA (adaptive array antenna) processing, as shown in FIG. 16. The control flow then goes to SC8 to determine whether the reception of the reply signal from the radio-frequency identification tag 14 is completed. This step SC 8 is repeatedly implemented as long as a negative decision is obtained in the step. When an affirmative decision is obtained in SC8, the control flow goes to SC9 corresponding to the AM demodulating portion 40 and FM decoding portion 42, to AM-demodulate and FM-decode the received signals, for thereby reading out the information relating to the modulation by the radio-frequency identification tag 14. The routine of FIG. 15 is followed by SA2 and the subsequent steps of FIG. 13, or SB3 and the subsequent steps of FIG. 14.

The routine illustrated in the flow chart of FIG. 16 is provided to perform the AAA processing of the received signals received by the receiver antenna 80. The present routine is initiated with SD1 to determine whether a predetermined sampling time has elapsed. This step SD1 is repeatedly implemented as long as a negative decision is obtained in the step. If an affirmative decision is obtained in SD1, the control flow goes to SD2 to calculate an error signal (a difference between the expected-value signal and an actual signal) regarding the composite signal generated by the signal synthesizing portion 78. Then, SD3 is implemented to calculate a correlation between the expected-value signal and an input signal of each of the plurality of amplitude/phase control portions 76 corresponding to the respective antenna elements 62. The control flow then goes to SD4 to insert the error signal calculated in SD2 and the correlation calculated in SD3, in a well known recurrence formula for updating the AAA weight w, so that the value of the AAA weight w to be given to the received signal received by each antenna element 62 is updated, on the basis of a result of calculation according to the recurrence formula. SD5 is then implemented to set the AAA weight w updated in SD4, in the weight register of the adaptive processing portion 72. Then, SD6 is implemented to determine whether the weight w has been converged into the optimum value. If a negative decision is obtained in SD6, the control flow goes back to SD1 and the subsequent steps. If an affirmative decision is obtained in SD6, the present routine is terminated. The steps SD1 through SD6 correspond to the plurality of amplitude/phase control portions 76 and the adaptive processing portion 72.

The radio-frequency identification tag communication device 60 according to the present invention described above includes the directivity control portion in the form of the BFA weight-value setting portion 64 (SC1 through SC5) operable to control the directivity of the transmitter antenna 70, and the adaptive weight control portion in the form of the adaptive processing portion 72 (SD1 through SD6) operable to implement the adaptive control of the weight to be given to the received signal received by each of the plurality of antenna elements 62, on the basis of the reply signal transmitted from the radio-frequency identification tag 14. Accordingly, the directivity of the transmitter antenna 70 is changed to a direction in which the radio-frequency identification tag 14 in question is expected to exist, and the weight to be given to each received signal is subjected to the adaptive control, so that the sensitivity of communication of the communication device 60 with the radio-frequency identification tag 14 is improved. Namely, the present radio-frequency identification tag communication device 60 has an increased maximum distance of communication with the radio-frequency identification tag 14.

Further, the transmitter antenna 70 has the plurality of antenna elements 62, and the BFA weight-value setting portion 64 is operable to control the phase and amplitude of the transmission signal to be transmitted from each of the plurality of antenna elements 62, for thereby controlling the directivity of the transmitter antenna 70. Thus, the directivity of the transmitter antenna 70 is controlled in a practically effective manner.

Further, the adaptive processing portion 72 is operable to set an initial value of the AAA weight to be given to each received signal, on the basis of the directivity of the transmitter antenna 70 set by the BFA weight-value setting portion 64. Accordingly, the AAA weight to be given to each received signal can be rapidly converged into an optimum value, and a bit string included in the reply signal transmitted from the radio-frequency identification tag 14 can be received, without a failure to receive a leading portion of the bit string, so that the maximum distance of communication with the radio-frequency identification tag 14 can be further increased. In addition, the preamble of the bit string can be shortened, so that the time required for communication with the radio-frequency identification tag 14 can be shortened, making it possible to increase the number of radio-frequency identification tags within a unit time.

Further, the transmitter antenna 70 and the receiver antenna 80 commonly use the plurality of antenna elements 62, so that the radio-frequency identification tag communication device 60 can be small-sized.

Further, the radio-frequency identification tag communication device 60 includes the phased-array control portion in the form of the plurality of AM modulating portions 36 (SC1 through SC5) operable to control the weight to be given to each of the transmission signals to be transmitted from the plurality of antenna elements 62, on the basis of the directivity of the transmitter antenna 70 set by the BFA weight-value setting portion 64, and the adaptive-array control portion in the form of the plurality of amplitude/phase control portions 76 (SD1 through SD6) operable to implement the adaptive control of the weight to be given to each of the received signals to be received by the plurality of antenna elements 62. Accordingly, the directivity of the transmitter antenna 70 and the directivity of the transmitter antenna 80 can be controlled in a practically effective manner.

Further, the plurality of Am-modulating portions 36 are operable to control the weight to be given to each transmission signal, so as to maximize a density of transmission power in a direction determined by the directivity of the transmitter antenna 70 set by the BFA weight-value setting portion 64. Accordingly, the directivity of the transmitter antenna 70 can be changed in a practically effective manner, to a direction in which the radio-frequency identification tag 14 in question is expected to exist.

Further, the plurality of amplitude/phase control portions 76 is operable to implement the adaptive control of the weight to be given to each of the received signals received by the plurality of antenna elements 62, so as to maximize a signal-to-noise ratio (a ratio of a desired signal to an interference signal) of a composite signal which is synthesized by combining together the received signals to which the weight has been given. Accordingly, the weight to be given to each received signal can be controlled in a practically effective manner.

Embodiment 2

Another preferred embodiment of this invention will be described in detail by reference to the drawings. In the drawing figures referred to in the following description, the same reference signs as used in the preceding embodiment will be used to identify the same elements, redundant description of which is not provided.

Figure 17:
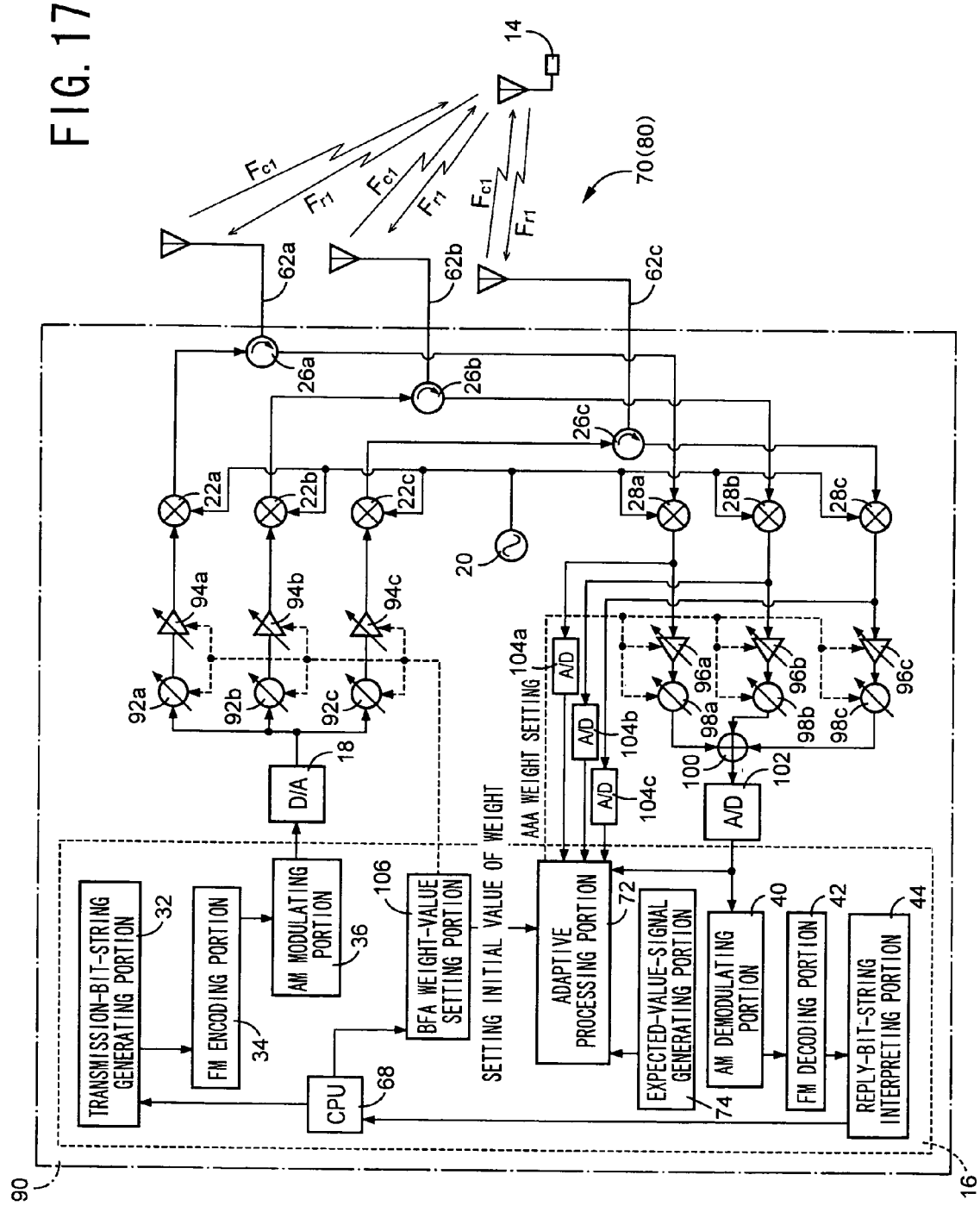
FIG. 17 is a view showing an electric arrangement of a radio-frequency identification tag communication device according to another embodiment of this invention.

Referring to FIG. 17, there is shown an electric arrangement of a radio-frequency identification tag communication device 90 according to the second embodiment of this invention. This radio-frequency identification tag communication device 90 includes: an Am modulating portion 36 arranged to modulate the encoded signal encoded by the FM encoding portion 34, according to an AM method, on the basis of predetermined information; a transmission-signal D/A converting portion 18 arranged to covert the digital transmission signal generated by the AM modulating portion 36; a plurality of transmitter variable phase shifters 92a, 92b, 92c (hereinafter collectively referred to as transmitter variable phase shifters 92, unless otherwise specified) arranged to control the respective phases of the analog transmission signal generated by the transmission-signal D/A converting portion 18, which phases correspond to the plurality of antenna elements 62, respectively; a plurality of transmitter variable amplifiers 94a, 94b, 94c (hereinafter collectively referred to as transmitter variable amplifiers 94, unless otherwise specified) arranged to control the amplitudes of the respective transmission signals the phases of which have been controlled by the transmitter variable phase shifters 92, and to supply the transmission signals to the respective up converters 22; a plurality of receiver variable amplifiers 96a, 96b, 96c (hereinafter collectively referred to as receiver variable amplifiers 96) arranged to control the amplitudes of the respective received signals the frequencies of which have been reduced by the respective down converters 28; a plurality of receiver variable phase shifters 98a, 98b, 98c (hereinafter referred to as receiver variable phase shifters 98) arranged to control the phases of the respective received signals the amplitudes of which have been controlled by the respective receiver variable amplifiers 96; a signal synthesizing portion 100 arranged to synthesize a composite signal by combining together the received signals the phrase of which have been controlled by the receiver variable phase shifters 98; a composite-signal A/D converting portion 102 arranged to convert the composite signal generated by the signal synthesizing portion 100, into a digital signal which is to be applied to the DSP 16; and a plurality of received-signal A/D converting portions 104a, 104b, 104c (hereinafter collectively referred to as received-signal A/D converting portions 104) arranged to convert the received signals the frequencies of which have been reduced by the respective down converters 28, into digital signals which are to be applied to the DSP 16. In FIG. 17, the sampling-frequency oscillating portion operable to generate the sampling frequency for the D/A converting and A/D converting portions is not shown.

The DSP 16 of the radio-frequency identification tag communication device 90 is further provided with a functional component in the form of a BFA weight-value setting portion 104 functioning as a directivity control portion arranged to control the directivity of the transmitter antenna 70 having the antenna elements 62, by controlling the phases and amplitudes of the transmission signals to be transmitted from the antenna elements 62. The plurality of transmitter variable phase shifters 92 and the plurality of transmitter variable amplifiers 94 are arranged to control the phases and amplitudes of the transmission signals, according to control values received from the BFA weight-value setting portion 106. The variable phase shifters 92 and variable amplifiers 94 may function as a phased-array control portion operable to control a weight to be given to each of the transmission signals to be transmitted from the respective antenna elements 62, on the basis of the directivity of the transmitter antenna 70 set by the BFA weight-value setting portion 106.

The DSP 16 of the radio-frequency identification tag communication device 90 is provided with a further functional component in the form of an adaptive processing portion 72 functioning as an adaptive weight control portion operable to implement an adaptive control of a weight to be given to each of the received signals to be received by the respective antenna elements 62 and applied to the respective received-signal A/D converting portions 104. The receiver variable amplifiers 96 and the receiver variable phase shifters 98 are operable to control the amplitudes and phases of the received signals, according to the control values received from the adaptive processing portion 72.

In the radio-frequency identification tag communication device 90 constructed as described above, the phases and amplitudes of the transmission signals and the phases and amplitudes of the received signals are controlled by analog signal processing operations, by the transmitter variable phase shifters 92 and amplifiers 94, and by the receiver variable phase shifters 98 and amplifiers 96. The present second embodiment requires the plurality of transmitter variable phase shifters 92, plurality of transmitter variable amplifiers 94, plurality of receiver variable amplifiers 96 and plurality of receiver variable phase shifters 98, which are not required in the first embodiment in which the phases and amplitudes of the transmission signals and the received signals are controlled by digital signal processing operations. However, the second embodiment is advantageous in that the second embodiment facilitates the phase and amplitude controls, even where the sampling frequency is comparatively low.

Figure 18:
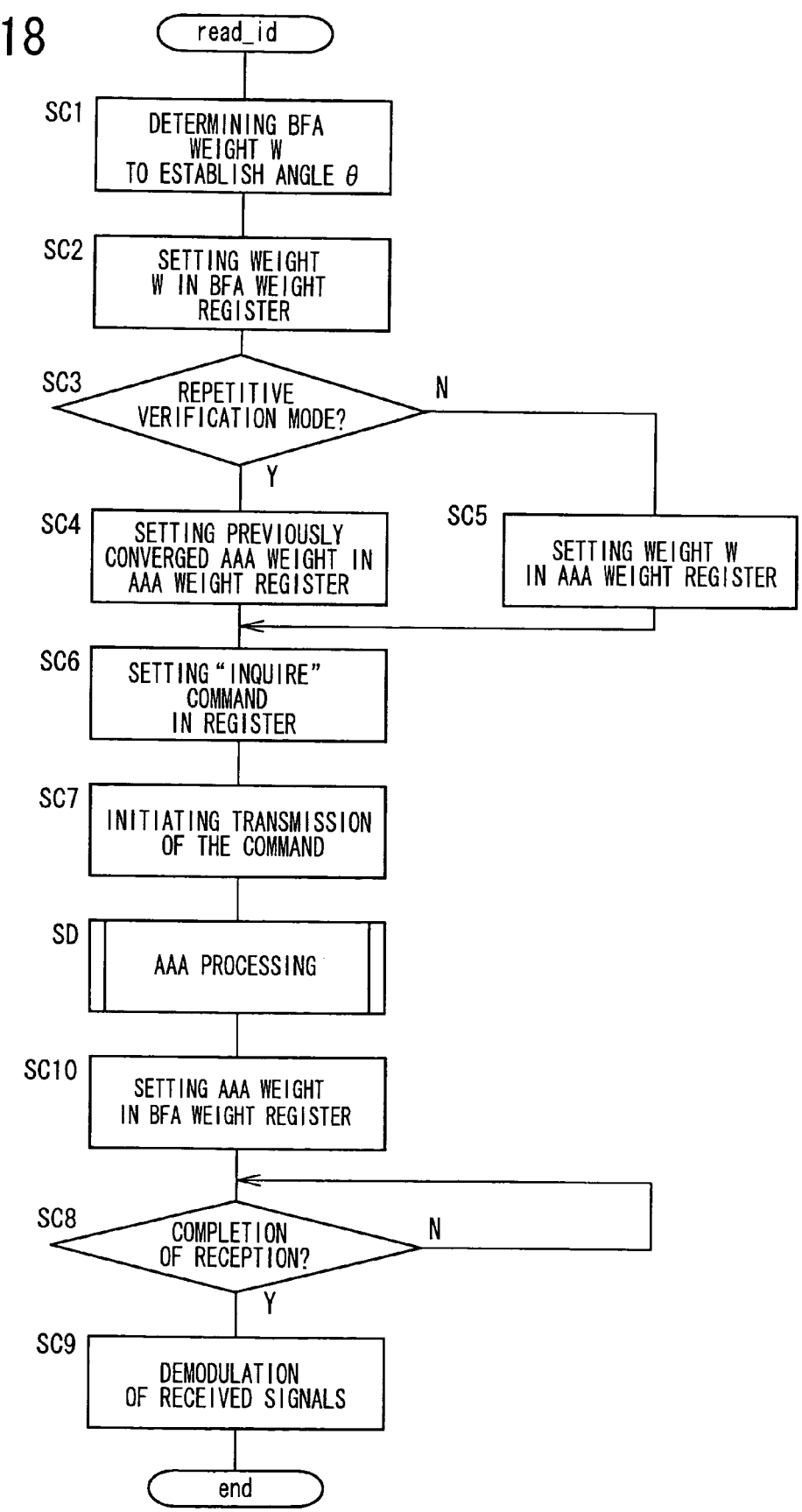
FIG. 18 is a flow chart illustrating a major portion of an operation of a DSP of the radio-frequency identification tag communication device of FIG. 17 for communication with the radio-frequency identification tag.

FIG. 18 is a flow chart illustrating a routine executed by the DSP of the radio-frequency identification tag communication device 60, to read out the ID data from the radio-frequency identification tag 14. The present routine corresponds to that of FIG. 15 described above. In the flowchart of FIG. 15, the same steps as described above with respect to the first embodiment will not be described. In the present routine, the AAA processing is followed by SC10 to set the weight converged by the AAA processing, in the weight register of the BFA weight-value setting portion 106. Then, SC8 and the subsequent steps are implemented. Namely, the weight is determined by the BFA processing for the next reception of the received signals, by reference to an AAA weight into which the weight has been converged in the AAA processing in the last reception of the received signals.

In the present second embodiment described above, the BFA weight-value setting portion 106 (SC1 through SC5, and SC10) is operable to set again the directivity of the transmission antenna 70, on the basis of an AAA weight value into which the weight has been converged by the adaptive control of the weight to be given to each received signal by the adaptive processing portion 72. Accordingly, the transmission signals having an increased intensity can be transmitted toward the radio-frequency identification tag 14 in question, so that the maximum distance of communication with the radio-frequency identification tag 14 can be further increased.

While the preferred embodiments of the present invention have been described above in detail by reference to the drawings, it is to be understood that the present invention is not limited to the details of these embodiments, but may be otherwise embodied.

Although the radio-frequency identification tag communication device 60, 90 of the preceding embodiments is used as an interrogator in the RFID communication system, the present invention is not limited to the interrogator, but is suitably applicable to a radio-frequency identification tag fabricating device arranged to write desired information on the radio-frequency identification tag 14, and a radio-frequency identification tag reader/writer arranged to read and write information on and from the radio-frequency identification tag 14.

In the preceding embodiments, the FM encoding portion 34, AM modulating portion 36, AM demodulating portion 40, FM decoding portion 42, BFA weight-value setting portion 64, adaptive processing portion 72, etc. are functional control components of the DSP 16. However, those components may be individual control elements formed separately from the DSP 16.

The radio-frequency identification tag communication device 60, 90 of the preceding embodiments includes the DSP (Digital Signal Processor) 16, which includes the functional control components such as the BFA weight-value setting portion 64 and the adaptive processing portion 72. However, the DSP 16 may be replaced by an FPGA (Field Programmable Gate Array), which include functional control components such as the BFA weight-value setting portion and the adaptive processing portion 72.

The radio-frequency identification tag communication device 60, 90 of the preceding embodiments has the plurality of antenna elements 62 functioning as not only the transmitter antenna 70 for transmitting the transmission wave $F_{c1}$ toward the radio-frequency identification tag 14, but also the receiver antenna 80 for receiving the reflected wave $F_{r1}$ returned from the radio-frequency identification tag 14. However, the transmitter antenna 70 and the receiver antenna 80 may be constituted by respective two sets of antenna elements.

It is to be understood that the present invention may be embodied with various other changes and modifications, which may occur to those skilled in the art, without departing from the sprint of the present invention.

What is claimed is:

1. A radio-frequency identification tag communication device for radio communication with a radio-frequency identification tag, by transmitting a transmission signal from a transmitter antenna toward the radio-frequency identification tag, and receiving a reply signal transmitted from the radio frequency identification tag in response to the transmission signal, through a receiver antenna comprising a plurality of antenna elements, said radio-frequency identification tag communication device comprising:
- a directivity control portion configured to control a directivity of said transmitter antenna comprising a plurality of antenna elements; and
- an adaptive weight control portion configured to implement an adaptive control of a weight given to a received signal received by each of said plurality of antenna elements of said receiver antenna comprising a plurality of antenna elements, and a weight given to said transmission signal transmitted from each of said plurality of antenna elements of said transmission antenna;
- wherein said directivity control portion is configured to control at least one of a phase and an amplitude of a transmission signal transmitted from each of said plurality of antenna elements, for thereby controlling the directivity of the transmitter antenna and
- wherein the transmission signals respectively transmitted from said plurality of antenna elements of said transmitter antenna and the received signals respectively received by said plurality of antenna elements of said receiver antenna have a same frequency, said adaptive weight control portion controls the weight given to the said received signals, such that the weight given to said received signals is different from the weight given to the said transmission signals.

2. The radio-frequency identification tag communication device according to claim 1, wherein said adaptive weight control portion is configured to set an initial value of the weight given to each received signal, on the basis of the directivity of the transmitter antenna set by said directivity control portion.

3. The radio-frequency identification tag communication device according to claim 2, said directivity control portion comprises one of a phased-array control portion and a beam forming control portion configured to control the weight given to each of the transmission signals transmitted from said plurality of antenna elements, on the basis of the directivity of the transmitter antenna, and said adaptive weight control portion comprises an adaptive-array control portion configured to implement the adaptive control of the weight given to each of the received signals received by said plurality of antenna elements.

4. The radio-frequency identification tag communication device according to claim 2, wherein said directivity control portion is configured to set again the directivity of said transmission antenna, on the basis of a value of the weight into which the weight has been converged by said adaptive control of the weight given to the received signal by said adaptive processing portion.

5. The radio-frequency identification tag communication device according to claim 4, said directivity control portion comprises one of a phased-array control portion and a beam forming control portion configured to control the weight given to each of the transmission signals transmitted from said plurality of antenna elements, on the basis of the directivity of the transmitter antenna, and said adaptive weight control portion comprises an adaptive-array control portion configured to implement the adaptive control of the weight given to each of the received signals received by said plurality of antenna elements.

6. The radio-frequency identification tag communication device according to claim 1, wherein said directivity control portion is configured to set again the directivity of said transmission antenna, on the basis of a value of the weight into which the weight has been converged by said adaptive control of the weight given to said received signal by said adaptive processing portion.

7. The radio-frequency identification tag communication device according to claim 6, said directivity control portion comprises one of a phased-array control portion and a beam forming control portion configured to control the weight given to each of the transmission signals transmitted from said plurality of antenna elements, on the basis of the directivity of the transmitter antenna, and said adaptive weight control portion comprises an adaptive-array control portion configured to implement the adaptive control of the weight given to each of the received signals received by said plurality of antenna elements.

8. The radio-frequency identification tag communication device according to claim 1, wherein said transmitter antenna and said receiver antenna commonly use a plurality of antenna elements.

9. The radio-frequency identification tag communication device according to claim 8, said directivity control portion comprises one of a phased-array control portion and a beam forming control portion configured to control the weight given to each of the transmission signals transmitted from said plurality of antenna elements, on the basis of the directivity of the transmitter antenna, and said adaptive weight control portion comprises an adaptive-array control portion configured to implement the adaptive control of the weight given to each of the received signals received by said plurality of antenna elements.

10. The radio-frequency identification tag communication device according to claim 1, said directivity control portion comprises one of a phased-array control portion and a beam forming control portion configured to control the weight given to each of the transmission signals transmitted from said plurality of antenna elements, on the basis of the directivity of the transmitter antenna, and said adaptive weight control portion comprises an adaptive-array control portion configured to implement the adaptive control of the weight given to each of the received signals received by said plurality of antenna elements.

11. The radio-frequency identification tag communication device according to claim 1, wherein said directivity control portion is configured to control the weight given to said transmission signal, so as to maximize a density of transmission power in a direction determined by the directivity of said transmitter antenna.

12. The radio-frequency identification tag communication device according to claim 1, wherein said adaptive weight control portion is configured to implement the adaptive control of the weight given to each of the received signals received by said plurality of antenna elements, so as to maximize a signal-to-noise ratio of a composite signal which is synthesized by combining together said received signals to which the weight has been given.

13. The radio-frequency identification tag communication device according to claim 1, wherein said transmitter antenna comprises a plurality of antenna elements, and said transmitter antenna and said receiver antenna have at least one common antenna element, said directivity control portion being configured to give a weight to the transmission signal transmitted from each of said at least one common antenna element, while said adaptive weight control portion being configured to give the weight to the received signal received by each of said at least one common antenna element.

* * * * *